(12) United States Patent
Davies et al.

(10) Patent No.: US 10,810,488 B2
(45) Date of Patent: Oct. 20, 2020

(54) NEUROMORPHIC CORE AND CHIP TRAFFIC CONTROL

(71) Applicant: Intel Corporation, Santa Clara, CA (US)

(72) Inventors: Michael I Davies, Portland, OR (US); Andrew M Lines, Portland, OR (US); Jonathan Tse, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 974 days.

(21) Appl. No.: 15/385,052

(22) Filed: Dec. 20, 2016

(65) Prior Publication Data
US 2018/0174032 A1 Jun. 21, 2018

(51) Int. Cl.
G06N 3/04 (2006.01)
G06N 3/063 (2006.01)
G06N 3/08 (2006.01)

(52) U.S. Cl.
CPC .......... *G06N 3/0635* (2013.01); *G06N 3/049* (2013.01); *G06N 3/063* (2013.01); *G06N 3/08* (2013.01)

(58) Field of Classification Search
CPC ................................. G06N 4/04; G06N 4/049
See application file for complete search history.

(56) References Cited

U.S. PATENT DOCUMENTS

| 2015/0302295 | A1 | 10/2015 | Rivera et al. |
| 2016/0224889 | A1 | 8/2016 | Alvarez Icaza Rivera et al. |
| 2017/0293557 | A1* | 10/2017 | Guthrie ............... G06F 12/0815 |
| 2018/0096242 | A1* | 4/2018 | Modha ................... G06N 3/063 |

OTHER PUBLICATIONS

Walter, Florian, Florian Röhrbein, and Alois Knoll. "Neuronnorphic implementations of neurobiological learning algorithms for spiking neural networks." Neural Networks 72 (2015): 152-167. (Year: 2015).*
"European Application Serial No. 17204238.4, Extended European Search Report dated May 17, 2018", 10 pgs.
Sergio, Davies, "Maintaining real-time synchrony on SpiNNaker", Computing Frontiers, ACM, 2 Penn Plaza, Suite 701 Newyork NY 10121-0701 USA, (May 3, 2011), 2 pgs.
Tseng, Yu-Lun, "Scalable mutli-layer barrier synchronization on NoC", 2016 International Symposium on VLSI Design, Automation and Test (VLSI-DAT), IEEE, (Apr. 25, 2016), 4 pgs.
"European Application Serial No. 17204238.4, Response filed May 15, 2018 to Extended Search Report dated May 17, 2018", 12 pgs.

* cited by examiner

*Primary Examiner* — Hal Schnee
(74) *Attorney, Agent, or Firm* — Schwegman Lundberg & Woessner, P.A.

(57) ABSTRACT

Systems and methods may include neuromorphic traffic control, such as between cores on a chip or between cores on different chips. The neuromorphic traffic control may include a plurality of routers organized in a mesh to transfer messages; and a plurality of neuron cores connected to the plurality of routers, the neuron cores in the plurality of neuron cores to advance in discrete time-steps, send spike messages to other neuron cores in the plurality of neuron cores during a time-step, and send barrier messages.

25 Claims, 6 Drawing Sheets

NEUROMORPHIC CORE AND CHIP TRAFFIC CONTROL

BACKGROUND

In neuromorphic computing, signals are communicated between neurons through voltage or current spikes. This communication is different from that used in current digital systems, in which the signals are binary, or an analogue implementation, which relies on the manipulation of continuous signals. A conventional device has a unique response to a particular stimulus or input. In contrast, the typical neuromorphic architecture relies on changing the properties of an element or device depending on the past history. Plasticity allows the complex neuromorphic circuits to be modified ("learn") as they are exposed to different signals.

Typically when implementing a neural network in hardware, neurons are organized into cores. Signal communication is facilitated between neurons on the cores and neurons on different cores arranged on a chip. In one example, communication between the different cores on the chip uses a single mesh fabric. However, when read messages are introduced into the chip system using the single mesh, cyclic deadlocks may occur, so management configuration is done through a separate communication system.

In order to simulate a neural network, the simulation time of all cores must be advanced in a coordinated fashion. Some techniques use a time-based synchronization technique to change time periods in the timing structure. In one example, the time-based synchronization technique makes a system wait a period of time, to determine when a time period has ended. After waiting the period of time, spikes or events may be sent again at a next time period. This technique results in idle time that is undesirable.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
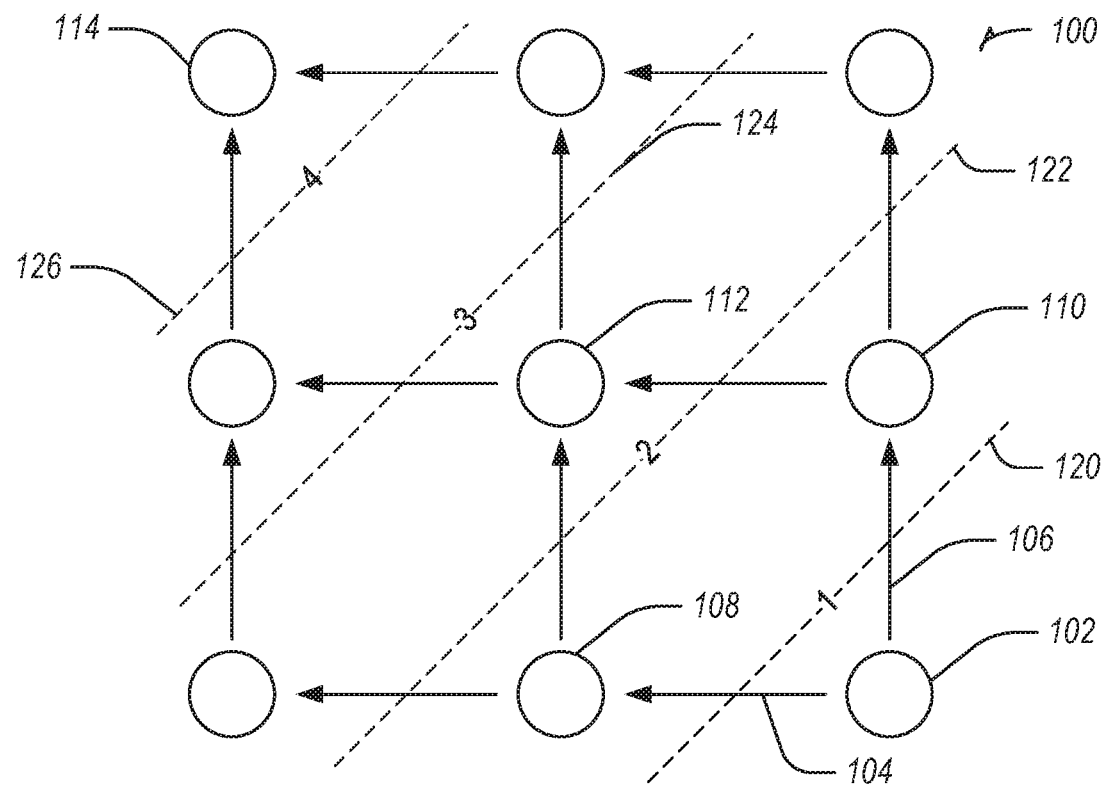
FIGS. 1A-1B illustrate a chip with neuromorphic neuron cores in accordance with some embodiments.

Neuromorphic computing aims to replicate the computational methods of the brain. These methods may be implemented in digital circuitry. Previous implementations have localized compute and memory elements associated with some number of neurons (typically hundreds) into a "neuron core". Then multiple cores (hundreds to thousands) are connected on a chip. Spikes between cores are sent as messages through a communication fabric. Some implementations have extended the communication fabric between multiple chips to simulate larger neural networks.

The systems and methods described herein include a fabric and related protocols to implement neuromorphic computing on large chips or multiple chips. A variety of details of the neuron model may change and incorporated into the systems and methods described herein. When a neuron spikes on one core, it sends some amount of information to all neurons in its fanout set, which may exist on the same core or on different cores on the same chip, or cores on other chips.

The basic connectivity for communicating spikes may be achieved on a chip by a two dimensional routing mesh using dimension-order-routing. Messages have a header that indicate the desired destination X and Y coordinates in the mesh. In an example, 5-port routers inspect the header and send them either north, south, east, west, or to a locally connected core. If multiple messages need to use the same link at the same time, an arbitration mechanism chooses which one goes first, and delays the other with flow-control. In an example, 8-port routers may be used, each of which connects to 4 local cores. In addition to the X and Y coordinates of the router, the destination address also includes a 2-bit P field to select between the local cores.

In an example, variable length messages terminated by a tail bit may be used, such that both short and longer messages are supported. This allows the same fabric to be used to carry read/write messages to configure the neuron cores and carry spikes. To avoid a cyclic deadlock on reads, two physical parallel fabrics, called Q (request) and P (response) may be used with the same topology. A read request message travels from a CPU to a neuron core on the Q fabric, and the read response returns on the P fabric, avoiding deadlock. Writes use the Q fabric to stay in order with reads. This may be achieved with the use of virtual channels or priorities. In an example, both P and Q fabrics may be used to send spikes, which don't have the cyclic deadlock or ordering problems. This dual fabric may be simpler and more efficient than virtual channels, for example when the typical traffic of the fabric is spikes instead of read/write traffic.

To enable communication between chips, a "bridge" unit may be connected to the mesh, for example at a "northwest" corner of a chip (e.g., in a particular orientation, at a topmost and leftmost corner). In an example, an extra "remote" header is pre-pended to messages that are to travel between chips. This header directs the message to the bridge, and also provides a chip destination address. The chip-to-chip routing may use a similar routing algorithm, such as a two dimensional mesh. However, there is a potential cyclic deadlock if the messages between chips use the same mesh twice. To prevent this potential cyclic deadlock, remote messages are allowed to be sent from the source to the bridge on the Q fabric, then use the chip-to-chip fabric, and finally deliver the messages from the destination chip's bridge to the destination core using the P fabric. The destination chip's bridge removes the remote header to expose the local message header. Since both P and Q fabrics may be used to communicate between chips, reads between chips may be performed by adding two more fabrics for read responses. In another example, reads may be prevented between chips to eliminate these two additional fabrics. Message passing communication using only write messages may be used in this example.

An example neuromorphic technique works by causing each core to evaluate its neurons at a current time-step, sending zero or more spikes to other cores if its neurons fire. Before starting a next time-step, all cores should receive all the spikes intended for that time-step. After the cores finish sending spikes, they may execute a "barrier synchronization" technique to flush all spikes out of the fabric and let all the cores know when to begin the next time-step.

Other have u implementations have used a large timeout, on the assumption that the maximum time spikes can take to reach their destinations is bounded. In order for this to work reliably, the timeout needs to be much larger than the typical time necessary. Large amounts of spiking and network congestion may, in the worst case, increase the timeout substantially. A timeout is a simple but may be a low performance solution.

In the systems and methods described herein, barrier synchronization is implemented to tell cores when they have received all spites and start the next time-step without a timeout. This is done by introducing a new message encoding called a "barrier token". The cores are designed to follow a sequence of actions such as waiting for a certain number of incoming barrier tokens, then sending a certain number of outgoing barrier tokens to specified destination cores. In an example, a southeast core (e.g., a core in a bottommost and rightmost location on an arbitrary orientation of a chip) starts sending tokens both north and west (e.g. to a neighbor core upwards in the arbitrary orientation and to a neighbor core to the left in the arbitrary orientation), and then each core after that may wait for those tokens to arrive before sending tokens onward north and west. Tokens are sent on both P and Q meshes, pushing any spikes in front of them. By the time this "upward" wavefront has passed a core, the core may know that there are no more spikes pending from cores to the south or east of it. Once the wavefront reaches the northwest core, that core sends barrier tokens to the bridge and may wait for one or more barrier tokens to return (e.g., from other cores on other chips). In a simple example case, two chips may exchange barrier tokens through their bridges. This may indicate that all upward spikes have been sent out the bridge. Next, the northwest core begins a "downward" wavefront to the south and east, pushing any spikes before it. Once the downward wavefront returns to the southeast core, all spikes for the current timestep will have been flushed from the system. When there is more than one core connected to each router, one core (e.g., a "tile-leader") may be selected to participate in the northwest and southeast wavefronts. The other cores (e.g., "tile-followers") may send and receive tokens from their tile-leader core.

After the upward and downward wavefronts complete, the southeast core will know that all spikes have been flushed. In a simple example case, the southeast core may send a message to every other core telling them to start the next time-step. This may be an inefficient process that wastes time and energy. In another example, all cores may increment respective core time-steps and start evaluating and spiking for the next time-step after the downward wavefront passes a respective core. When a wavefront passes a particular core, the particular core may know that it has received all spikes for the current time-step and may have enough information to advance time. If the particular core sends a spike south or east, the spike may pass the barrier tokens (which, for example, may have to hop in and out of cores while the spikes may travel more directly through the mesh). Including one or more bits of time-step in the spike message itself may distinguish these spikes for "future" time-steps from those that are meant for the "current" time-step. All cores may have a mechanism to save the future spikes for later.

One or more CPU's, peripheral cores, or external management interfaces may be connected to the mesh. When one of these components sends or receives a spike, the component will participate in the barrier synchronization technique. In an example, a "preemption" mechanism may be used so that the components may mark their barrier tokens for "preemption". The preemption property may be aggregated over the whole system, such as on the upward pass of barrier synchronization, and the property may be conveyed to all cores on the downward pass. Instead of starting the next time-step, the cores may prevent advancement of time and not send spikes. A second pass of preemption may be used to make sure all spikes are drained from the fabric. Then the components may issue read/write messages to the neuron cores. When the components have completed the read or write messages, the components may send regular barrier tokens (e.g., without the preemption property) to start a next spiking phase.

Systems and methods for neuromorphic traffic control between cores and chips are described herein. The systems and methods described herein may include incrementing time-step counters for asynchronous components of a chip. The systems and methods described herein may use a dual mesh to send messages without risk of cyclic deadlock.

Barrier synchronization is used to ensure that spikes from one time-step are all received by neuron cores before the cores start computing the next time-step. In an example, this is done by sending specially encoded event messages between neuron cores between spiking phases. In another example, this is done by simply waiting a period of time long enough to ensure that all events are done sending. These examples require wasted time and may inhibit or not allow for sleep mode, learning, or inter-chip communication.

In an example, there is an encoding of an event message that is used for barrier synchronization. A core may wait until the core receives a predetermined number of tokens, then send new tokens onward to a specified set of destination cores e.g., neighbor cores). The barrier tokens may flow through the same mesh channels as spike messages, read messages, write messages, or other event messages. A barrier synchronization event message may be configured in such a way that it pushes spike messages forward from a time-step in front of them, so that the arrival of all barrier synchronization tokens at a core means that all spike messages to that core have arrived. In an example, by encoding two bits of timestamp into spike messages, the next time-step may start on some cores while others are still waiting for barrier synchronization to be completed.

A core may send a spike messages to another core. The spike message may include information that a specific neuron in a core has spiked. The spike message may include 1-bit of information and some bits of addressing, such as destination core address bits. In an example, addressing includes destination core bits and destination axon bits for a neuron core. In an example, a spike message may be small (e.g., 32 to 64 bits, or greater), may have a fixed size, may be variably sized, such as with a tail bit to mark end of message, or the like.

As used herein, references to "neural network" for at least some examples is specifically meant to refer to a "spiking neural network"; thus, many references herein to a "neuron" are meant to refer to an artificial neuron in a spiking neural network. It will be understood, however, that certain of the following examples may also apply to other forms of artificial neural networks.

In an example of a spiking neural network, activation functions occur via spike trains, which means that time is a factor that has to be considered. Further, in a spiking neural network, each neuron may be modeled after a biological neuron, as the artificial neuron receives its inputs via synaptic connections to one or more "dendrites" (part of the physical structure of a biological neuron), and the inputs affect an internal membrane potential of the artificial neuron "soma" (cell body). In a spiking neural network, the artificial neuron "fires" (e.g., produces an output spike), when its membrane potential crosses a firing threshold. Thus, the effect of inputs on a spiking neural network neuron operate to increase or decrease its internal membrane potential, making the neuron more or less likely to fire. Further, in a spiking neural network, input connections may be stimulatory or inhibitory. A neuron's membrane potential may also be affected by changes in the neuron's own internal state ("leakage").

Figure 1B:
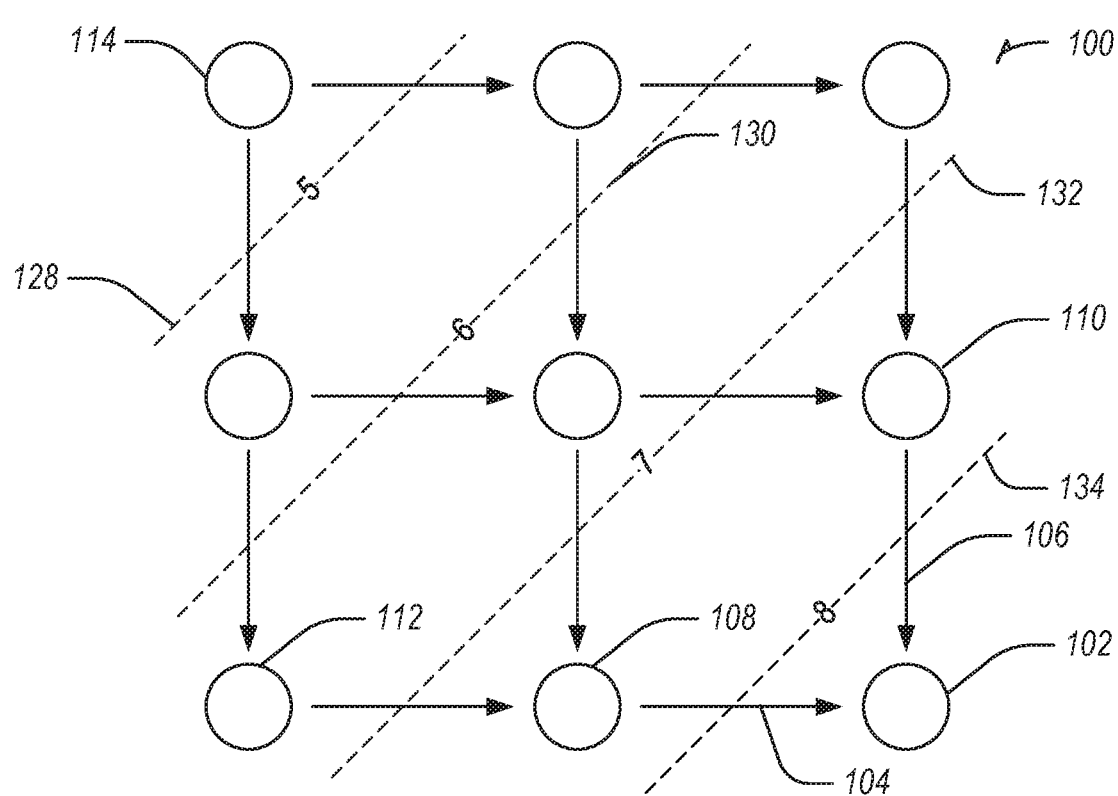

FIGS. 1A-1B illustrate a chip 100 with neuromorphic neuron cores (e.g., 102, 108, 110, 112, and 114) in accordance with some embodiments. A leader neuron core 102 may be designated. In an example, the leader neuron core 102 is in the southeast corner of the chip. In other examples, the leader neuron core 102 may be in other corners of the chip. A barrier synchronization token may be an event message configured to increment a counter at a core when received by the core. A fundamental support in each core may execute a sequential state-machine where at each step, the core waits for N expected barrier tokens (where N may be 0). Then the core sends M output barrier tokens to specified cores (where M may be 0). N and M may be small numbers, such as 2, 3, or 4 bits. Each step may optionally launch the next "action" (e.g., updating or learning in the core). The leader neuron core 102 may be a lowest numbered core in a tile. Other cores, such as 108, 110, or 112 may be tile-followers. The tile-followers may run a simpler sequence than the leader neuron core 102.

The leader neuron core 102, may start an "upward" wave-front 120 (labeled "1" in FIG. 1A as it is the first position of the wave-front 120) of barrier synchronization tokens that travels north and west to neighbor cores 110 and 108 respectively. The north bound token may travel along a mesh connection segment 106 that connects the leader neuron core 102 and the first neighbor core 110. The west bound token may travel along a mesh connection segment 104 that connects the leader neuron core 102 and the second neighbor core 108. The tokens will push any north or west bound spikes ahead of the token. The cores (e.g., 108 or 110) or other cores in the chip may wait for an expected number of tokens (e.g., core 108 may wait for one token from core 102, core 112 may wait for two tokens, such as from core 108 and core 110), then the tokens may continue to be sent to other cores north bound and west bound. For example, the second position 122 of the wave-front includes tokens sent from cores 108 and 110. The third position 124 of the wave front continues the tokens sent north and west, and the fourth position 126 of the wave-front shows the tokens arriving at core 114, which may be in a furthest north and west corner of the chip.

The core 114 in the northwest corner of the chip 100, in an example, is attached to a bridge or gateway for inter-chip communication. After the tile-leader of the northwest core 114 receives the upward wave-front, it may send a barrier token or tokens to the bridge, and may expect a token or tokens in return. When there are two chips with neuron cores directly connected, they may exchange tokens for each to indicate to the other that all "upward" traffic towards the bridge has been flushed out of respective meshes. The core 114 may send barrier tokens in a loopback to itself.

The core 114 may start a "downward" wave-front after receiving a specified number of tokens, which may include tokens from cores on the chip 100 or tokens from another chip via a bridge. The downward wave-front is shown in FIG. 1B, starting with a fifth position of the wave-front 128 and continuing with sixth 130, seventh 132, and eighth 134 positions of the wave-front as it moves through the chip. The core 114 may send barrier tokens in south and east directions, as the wave-front travels along a diagonal. The downward wave-front pushes any south or east bound spikes ahead of the wave-front. As the downward wave-front passes through each tile-leader, that tile-leader also sends barrier tokens to its followers.

After the wave-front reaches or passes a given core, that core may determine that a specified number of tokens has been received. In an example, the upward and downward wave-fronts may be repeated one more time to ensure that all event messages have been flushed from the system. In another example, after the specified number of tokens has been received at a core, the core may initiate a next action (e.g., a spike message).

In an example, a broadcast may be done to flush event messages. The broadcast may include sending barrier synchronization tokens from a first core to as many cores as the first core sends spikes to, and then the receiving cores may forward on the barrier synchronization tokens to cores they send spikes to, etc., until the network is entirely mapped with the synchronization tokens.

On the downward wave-front, a core may start a next time-step action as soon as the wave-front passes by (e.g., when a specified number of tokens are received). The core may increment a time-step register when the specified number of tokens are received. If a core sends an event message south or east, the event message may leapfrog the barrier wave-front, arriving at cores that are still completing the prior time-step. To avoid ambiguity, the 1 or 2 least significant bits of the time-stamp may be encoded in the spike message or event message. Each core may handle a spike or event message at a "future time". The spike or event messages may be stored at the cores using, for example, 16 time buckets. In another example, the least significant 2 bits of time may direct spike or event messages to increment four different banks of 1024 spike counters. In yet another example, two barrier synchronization passes may be performed between spiking to flush out A spikes, which eliminates the need to encode the time-step in the spike messages.

In an example, the barrier synchronization specifies to a core that the core may proceed to do a "next" action. A SEQUENCER unit of a neuron core or software on a core may be configured to agree on the next action. For example, the next action include a number of dendrite updates which advance time, such as with learning phases interspersed at a fixed interval.

The barrier token encoding may be a single-word event message, such as with DATA{ 15:2}=0. The preemption encoding may include DATA{1:0}. The TIME field may be ignored for barrier tokens, and may be left as 0. The linear state-machine may include discrete registers. For example, the registers may include: bs_cfg[0 . . . N_BS_CFG−1]={recv:4, send:4, action:1, last:1}. The receive and send fields may specify a number of barrier tokens to wait for or send before incrementing a time-step counter or advancing to a next bs_config state. If action=true the next action in the sequence may start. The next bs_cfg state may wait for the action to complete. When last=true is reached, the sequence may repeat. The barrier token destinations may be configured in another register. For example: bs_nexthop[0 . . . N_BS_NEXTHOP−1]={remote:1, chip_or_dest:16}. This register may indicate where to send the barrier sync message next, and the index may advance sequentially. For a remote barrier synchronization token, a remote header may be prepended with the chip field and sent to a bridge for forwarding to another chip. A subsequent entry may complete the remote barrier message. The bridge address may be hard-coded to X=0, Y=max, and P=0. The bs_state may include the idx:4, recv_count:4, and preempt: 2, for example, such as for use in debugging. The index of a current bs_nexthop table entry may be in an unmanaged state, and may reset at the end of a barrier sequence.

In an example, the chip 100 may include power management configuration settings. For example, a power state such as "sleep" may be included as part of barrier synchronization. In an example, power states may be managed during a management preempt phase by a CPU in communication with the chip 100 by sending specially encoded event messages to a core (e.g., the message may have DATA{15: 2}==11. Power management may be done when the core is idle, and all state has been retired to state variables, not tokens in channels. A timeout may be used to ensure these conditions, or a slight change to the barrier configuration may be used such that all barrier tokens are done before the power gating starts.

A power management unit (PMU) is a shim on the LQ port of the core that may capture these special event messages and discard them. The PMU may inspect the bottom 2 bits to determine a desired power state. The states may be encoded as 0=on, 1=sram_retention, 2=retention, 3=off, in an example. The PMU may proceed to put the core in that power state after determining the state. For example, the PMU may toggle the sleep and power pins of the SRAM's, the power enable pins for the logic power gating transistors, or two resets for retention state and non-retention state. The sequence may use countdown timers with constants configured on the config chain. The PMU itself may be always-on, and may be in a separate level of hard-hierarchy from the core it controls.

Once the MU is in a power-down state, it may wake up the core whenever another non-power-management message arrives. This may use a countdown timer or may wait for the end of the power enable chain. A wake-up may reset non-retention bundled-data controllers or latches. A retained state may be stored in flops or latches associated with CSP state variables, and the top-level ports may be parked at the same as their initial reset phase. A firewall may be added to the outputs of the core so that any glitches on reset avoid exposure to the mesh. In an example, the mesh protocol may always end on the even phase, and the PMU may be a shim on the bd(17) LQ port.

After a CPU decides it is time to wake up (e.g., based on a CPU reference clock), the CPU may send a barrier token to its tile-leader core, which may wake the core up and create a cascade of wake-ups along the barrier synchronization wave-front. In another example, the CPU may send a read or write to the cores to wake them up, such as when the CPU has management to perform.

Figure 2:
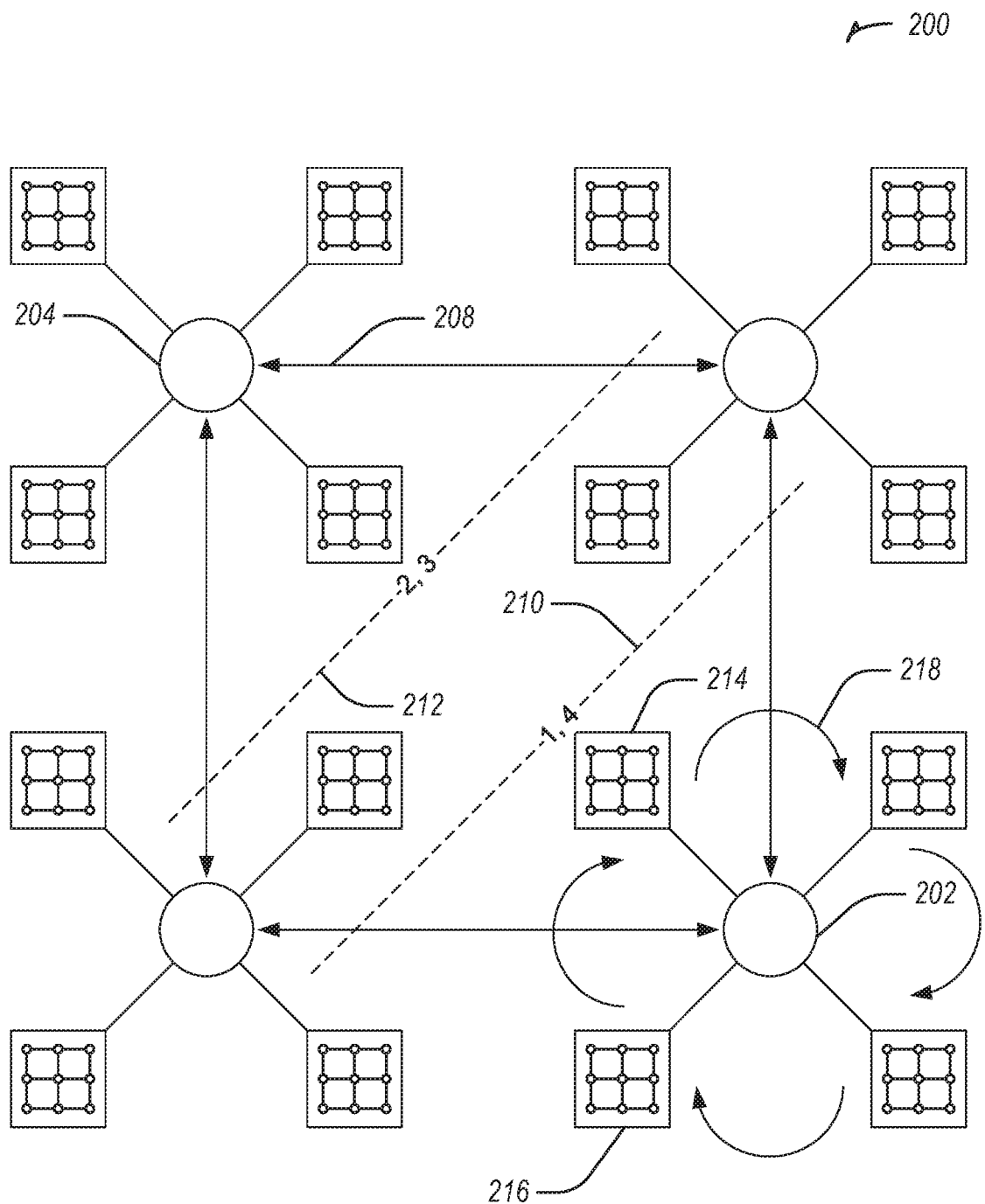
FIG. 2 illustrates a neuromorphic, multi-chip architecture in accordance with some embodiments.

FIG. 2 illustrates a neuromorphic, multi-chip architecture 200 in accordance with some embodiments. The multi-chip architecture 200 includes a plurality of crossbars (e.g., 202 or 204) which connect to at least one chip (e.g., chip 214 or 216) via ports. The crossbars (e.g., 202 or 204) may be arranged in a grid and connected via one or more meshes (e.g., two meshes, P and Q). A crossbar (e.g., 202 or 204) may have a single chip or a plurality of chips, though 4 chips per crossbar are shown in FIG. 2. In another example, a crossbar (e.g., 202 or 204) may have a plurality of chips, arranged in a two or three dimensional pattern. The grid of crossbars may be two-dimensional or three-dimensional.

In the example shown in FIG. 2, four cores are connected to each crossbar (e.g., 202 or 204). Routing may be done from crossbar to crossbar, and then to an individual chip from the crossbar. In an example, the chip 214 may have a single bidirectional channel, such as in a bridge to connect the chip to the crossbar 202 via a port.

In an example, barrier tokens may be exchanged among the crossbars and the chips. For example, a tile-leader core may expand the intra-chip (e.g., core to core) barrier token synchronization into a similar northwest wave-front and southeast wave-front between chips. For example, one of the chips connected to a crossbar, such as crossbar 202 may be selected as a leader chip, such as chip 214. The chip 214 may first do a barrier synchronization intra-chip to clear cores in the chip 214. After the northwest corner core receives a barrier synchronization token or tokens (e.g. from two neighbors) on the "upward" wave-front, the northwest corner core may have received the specified number of tokens, and may proceed to a next action. In this case, the next action (or the next action after initiating the "downward" wave-front by sending out barrier synchronization tokens) may be to send a barrier synchronization token off-chip to the crossbar 202. The crossbar 202 may forward the barrier synchronization token to a next chip (e.g., in the direction indicated by arrow 218). The process may be repeated until a final chip 216 for the crossbar 202 receives the barrier synchronization token. The final chip 216 may then indicate when its barrier synchronization is complete intra-chip, and send an indication to the leader chip 214 via the crossbar 202. When this process is complete for all chips on the crossbar 202, the crossbar 202 may send a barrier synchronization token to the neighbor crossbars and start an inter-chip wave-front. The inter-chip wave-front may proceed similar to the intra-chip wave-front discussed above for FIG. 1. For example, a first position 210 of the wave-front may proceed to a second position 212. When crossbar 204 is completed with the barrier synchronization process, it may initiated the downward wave-front back at the second position 212 and then to the first positon 210. The synchronization at crossbar 202 for the downward wave may proceed starting with the leader chip 214 or may go backward and start with the end chip 216. When the process is completed for the last chip on crossbar 202, then the chips and cores in the architecture will all be at the next time period.

In another example, a barrier synchronization technique may use cores to send barrier synchronization tokens to whatever other cores the first core might ever send spikes to or receive spikes from. The hierarchy of the core may be used such that tile-leaders may synchronize with other tiles without the other tiles also initiating synchronizing. A configuration may make each tile synchronize with its 4 nearest neighbor tiles. This topology may limit the spike messages to travelling at most 1 hop per time-step. Longer connections may be supported by "relay" neurons (e.g., neurons that receive the spike message and then forward the spike message on in a new spike message). In yet another example, a hybrid technique may be used by continuing to do full-mesh synchronization on a chip, and use the neighbors-only synchronization between chips on a board. Travelling between chips would then take at least 1 time-step per hop (and may use the relay neurons). The chip-to-chip latency component of barrier synchronization may be eliminated using the hybrid technique, making it arbitrarily scalable. The hybrid technique may be implemented with the tile-leader of the northwest tile by having it send 4 tokens to/from all neighboring chips (e.g., chips on the crossbar).

Figure 3:
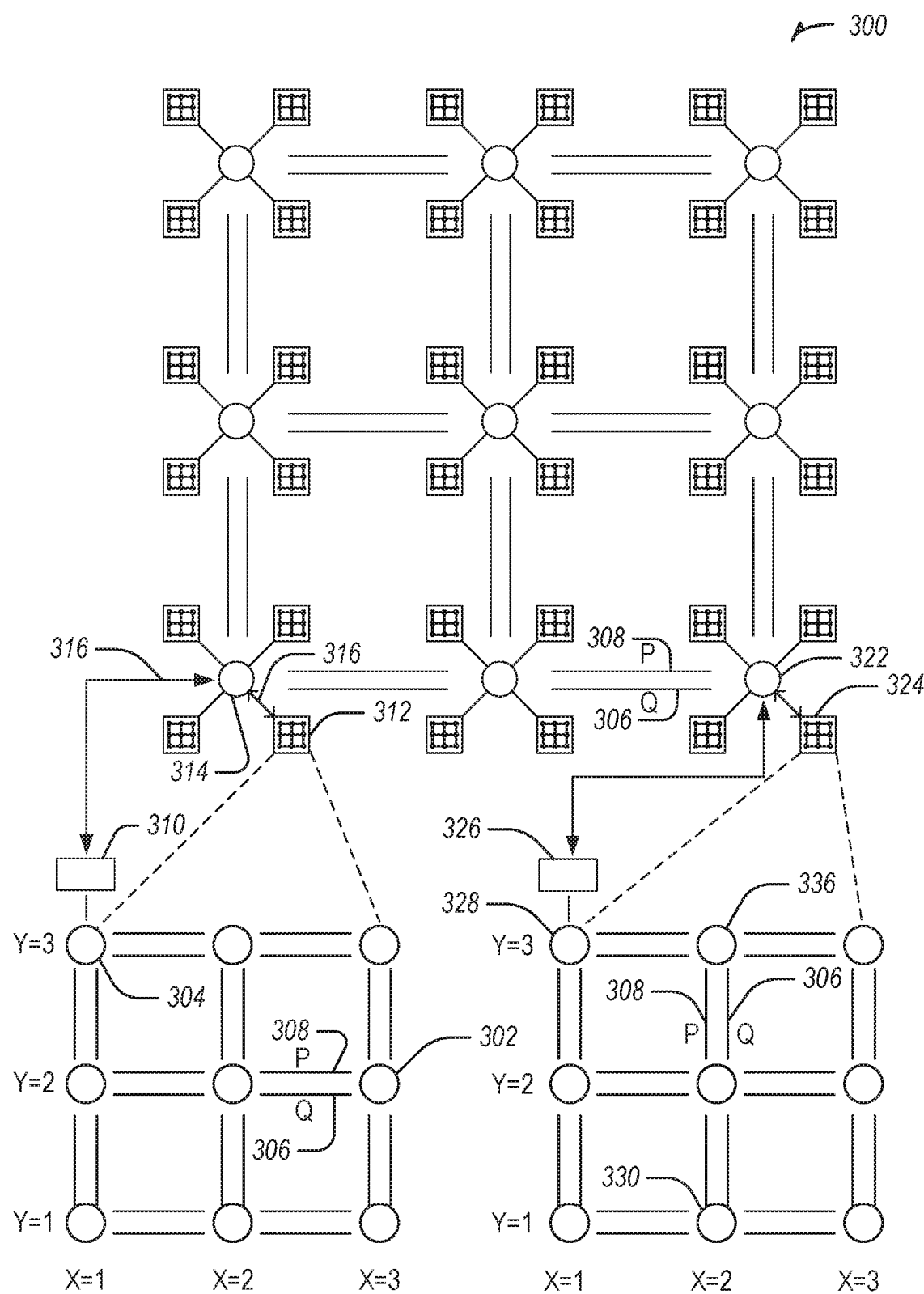
FIG. 3 illustrates a mesh network for inter-chip core-to-core communication in accordance with some embodiments.

FIG. 3 illustrates a mesh network 300 for inter-chip core-to-core communication in accordance with some embodiments. The mesh network 300 includes a plurality of chips with a plurality of cores on each of the plurality of chips. For example, chip 312 includes cores 302 and 304 and chip 324 includes cores 328, 330, and 336. The mesh network 300 may include a dual mesh grid overlaid on a chip (e.g., on chip 312 or chip 324) or a dual mesh grid overlaid on the plurality of chips connecting the chips (e.g., crossbar 314 or 322).

A mesh protocol, for example for chip 312, includes two separate bi-directional networks, named mesh Q (request) 306 and mesh P (response) 308. Both networks may be two-dimensional meshes with dimension-order routing (e.g., X direction then Y). Each eight-port crossbar (e.g., 314 or 322) may include up to four local ports (e.g., to connect to chip 312 and the other three chips on the crossbar) and up to four ports to go directionally (e.g., north, south, east, and west) to connect with other crossbars. The two meshes may be selected such that the Q mesh 306 does not block the P mesh 308 (e.g., the P mesh 308 has priority) to avoid deadlock. In an example, a crossbar may be a field-programmable gate array (FPGA) or other integrated circuit.

In an example, at the interfaces (e.g., between the cores and the meshes), the channels are 33 bits wide, with 32 bits of data and an extra least significant bit (LSB) bit called the tail bit. The tail bit may be used to close a link. For example, crossbars may open a link based on a header word of a message, then close the link after a tail bit of 1 passes through. A mesh address may be 12 bits and may include fields for an X direction of 5 bits, a Y direction of 5 bits, and a P address of 2 bits. With this configuration, the addressing may support 4,096 cores per chip and 65,356 chips in a system, totaling 256 million cores.

In an example, there are three formats for headers and address words. A Header word format may include 12 destination bits (e.g., a destination address core on a local chip), 1 or 2 time bits, which may be used to encode least significant bits of a timestamp for an event message (e.g., spike), 2 bits for a type (e.g., type of message: Read=0, Write=1, Event=2, Remote=3), and 16 bits for data (e.g., an overloaded field that may differ by message type). A WriteAddress word format (e.g., with a LSB first) may include 28 addressing bits (e.g., a 32 bit long-word aligned address may yield 1 GB address space per core) and an optional 4 bits (e.g., a byte) for enabling writes per byte. A ReadAddress word format (e.g., with a LSB first) may include 28 addressing bits (e.g., a 32 bit long-word aligned address may yield 1 GB address space per core) and 4 bits for LEN (with LEN+1 being the number of 32 bit long-words to read from 1 to 16).

In an example there may be 5 types of messages: event message, write message, read request message, read response message, and remote message that may be sent from core to core. The event message may include a header word (e.g., with nothing else). The event message may be allowed on either the Q mesh 306 or the P mesh 308 (e.g., the request or response mesh). In an example, the event message has 16 bits of data (e.g., application-specific data). The 16 bits of data may be used to encode a spike message, an interrupt, a synchronization message, etc. The event request message may have a message length of 4B. The event messages are distinguished within cores as Spike, interrupt. Barrier, etc. For example, a spike event encodes an axon index and optionally a weight or a delay.

The write message may include a header followed by a WriteAddress followed by 1 to 16 data words (e.g., until a tail bit is set). In an example, the write messages use the Q mesh 306 exclusively in order to stay coherent with read messages. The write message header may include 16 bits of data including optionally 12 bits for a source core return address (may not be needed by hardware but may be useful for debugging). In an example, in the write message, words are written to incrementing 32 bit word addresses. Byte enables may apply to all data words, so may only be useful with 1 data word. The write message may include a posted, un-acknowledged write. The write message may have a message length of 4B*(2+N).

A read is split into a read request and a read response. The read request message may include a header followed by a ReadAddress. When a read message is sent on the Q mesh 306, the Q mesh 306 may interpret the read message as a read request message. The read request message may include 16 bits of data including 12 bits of a return source core address for the read response. The read request message may include 4 bits of optional reordering in a (TAG). The read request message may have a message length of 4B*2.

The read response message may include a header followed by 1 to 16 data words. When a read message is sent on the P mesh 308, the P mesh 308 may interpret the read message as a read response message. The read response message may include 16 bits of data including 12 bits of destination addressing (DST) to address the target core, as well as 4 bits of optional reordering in a (TAG). In an example, the ReadAddress word is not included in the read response. When multiple reads are pipelined in a mesh, reordering may be done with the data (DST, TAG) field. In an example, CPU design may rotate through TAG and allow one outstanding request for each of 16 TAG values. The react response message may have a Message length of 4B*(1+N).

The remote message may include a remote header followed be either a write message or an event message. The local address of a gateway core on this chip may be stored in 12 bits of the remote message header. The remote message header may include 16 bits of data encoding the address of another chip. In an example, reads may not be allowed between chips to simplify the system. The remote message, when the remote message is for a write may have a message length of 4B*(3+N). The remote message, when the remote message is for an event may have a message length of 4B*2.

In an example, the read/write requests use mesh Q 306 and the read responses use mesh P 308 to prevent cyclic deadlock. Event messages may use either mesh Q 306 or mesh P 308. In an example, the system may not support inter-chip reads, such as to avoid latency or drop problems. Instead of supporting inter-chip reads message passing using write messages may be used.

In an example, the mesh network 300 may be used to avoid deadlock. Deadlock avoidance is used to drain incoming events even when outgoing channels are blocked. Deadlock is prevented by using the dual mesh setup of the mesh network 300. However, in an example, a read/write request on the Q mesh 306 may be blocked by outgoing traffic on the P mesh 308. Carrier tokens may be used for generating outgoing event messages to prevent his deadlock. Carrier tokens prevent neuron updates from hack-pressuring reception of event messages on the P mesh 308. In an example, event messages that go out on the Q mesh 306 may go through a large first in first out buffer that can hold all outgoing event messages that are generated on a time step to prevent deadlock. In another example, to prevent deadlock remote event messages start on the Q mesh 306 on the source chip and end up on the P mesh 308 on the destination chip. Local event messages (within a chip) may choose either mesh. For example, a neuron may have mode bits to choose always Q mesh 306, always P mesh 308, or random. Write messages may be sent to local memory of CPU's to implement message passing.

Inter-chip communication may use gateways (e.g., 310 and 326) to receive remote messages, which may enter the chip on Q mesh 306. After a remote message reaches a destination chip, the remote header may be removed. Gateways (e.g., 310 and 326) may forward remote messages to mesh P 308 on the destination chip to avoid deadlock. Gateways (e.g., 310 and 326) may not need configuration, or may have a known location in the inter-chip mesh. The inter-chip mesh may include a dual mesh. In other examples, the inter-chip mesh may use a spanning-tree, a fat-tree, a 3-D mesh, or the like to avoid deadlock. In an example, lossless flow control may be used on inter-chip links. For example, asynchronous bundled-data channels may be used. Messages may be encapsulated with error detection or correction on inter-chip links. Link-level retry may be used for corrupted messages. When a retry fails, bad messages may be dropped and may be counted for diagnostic purposes. Bad message-passing writes may be corrected by higher-level protocol such as TCP.

The gateways (e.g., 310 or 326) off-chip interfaces may include 17-bit asynchronous bundled-data channels in and out. The chip 312 may operate in two different modes: Master or Target.

In an example, in Master mode, the chip 312 is a master capable of sending write/event messages to another chip (e.g., 324) or FPGA also configured as a Master. Messages are sent to the gateway 310 on the Q mesh 306. The gateway 310 passes the messages directly to the off-chip output channel. This can go directly into another chip, or pass through an FPGA (e.g., the crossbar 314), which may use the remote header to route as a full crossbar or a 2D mesh. Messages enter chip 324 on the input channel, with the remote header attached. The chip 324 strips the remote header and forwards the message on the P mesh 308. The switch from Q to P meshes is done when traversing the 2nd level fabric, as this avoids cyclic deadlock which would otherwise occur if a message traversed the same mesh twice while routing a message.

In Target mode, the chip 312 may be a pure target and the FPGA a pure master, which connects the off-chip channels directly to the opposite mesh ports (that is, incoming port connects to Q mesh 306 and outgoing port comes from P mesh 308). The target mode allows the FPGA to read/write all chip 312 registers efficiently, without a serial bottleneck or busy-waiting.

The choice of Master or Target mode may be determined by what type of messages are send to the gateway. If the message has a remote header, the gateway may assume Master behavior (e.g., Q mesh 306 out, P mesh 308 in), while if there is no remote header the gateway may assume Target behavior (e.g., Q mesh 306 in, P mesh 308 out). Mixing these modes between two chips may not be used as it would lead to deadlock. However, an FPGA may switch between modes dynamically, and may support extra buffering to avoid or eliminate deadlock. When spiking and management phases are clearly separated, then an FPGA may alternate between Master and Target modes for different time steps.

A neuron core may already receive write/event messages on the P mesh 308 as well as on the Q mesh 306. A CPU core may use an additional shim. This shim may divert write/event message requests received from the P mesh 308 to merge with those on the Q mesh 306, while blocking any read requests on the Q mesh 306 until there is enough room in a first in first out to the P mesh 308 for the responses. The CPU may accept write/event messages from either fabric without causing deadlock.

In an example, by using both P and Q meshes for sending spikes, barrier synchronizations are also sent through both meshes. The tokens on either mesh may both be added to the same counter, so the expected value for tokens to arrive at a given core or chip may be doubled.

In an example, in a neuron core, priority may be given to incoming spike or event messages, e.g., using first in first out (FIFO). When the FIFO fills up, spike or event messages may be drained. If there is room in the FIFO, then a spike or event message may be generated and sent out. If there is no room in the FIFO, then generation of spike or event messages may be prevented.

In an example, an event message may be generated at core 302 to be sent to core 330. The event message may include an address for the core 330 (e.g., in FIG. 3, the address may be x=2 and y=1). The address may include a chip address as well as a crossbar address. The chip address may be two bits, since there are four chips per crossbar. Chip 324 is the destination chip for the core 330, so the crossbar 322 may be addressed. The crossbars may have similar (x,y) addressing, so crossbar 322 may be at x=3 and y=1. The event message will be sent out on the Q mesh 306 on the source chip 312. The event message may traverse the x-direction first, and travel from core 302 at (3,2) on chip 312 to a core at (1,2) before ending up at core 304 at (1,3). The event message may be forwarded on the Q mesh 306 from the core 304 to the gateway 310. The gateway 310 may send the event message along the port 316 from chip 312 to crossbar 314. The event message may then travel along the inter-chip mesh (e.g., mesh 306) to the destination crossbar 322. The crossbar 322 may send the event message to the destination chip 324 along a port. The destination chip 324 may then strip off the chip address (including the crossbar address) before the event message is received at the gateway 326. The gateway 326 may switch the mesh to the P mesh 308 and deliver the event message to core 328. Core 328 may determine the core address and send the event message to core 330, moving first along the x-direction to core 336 and then along the y-axis to core 330 in the P mesh 308.

Figure 4:
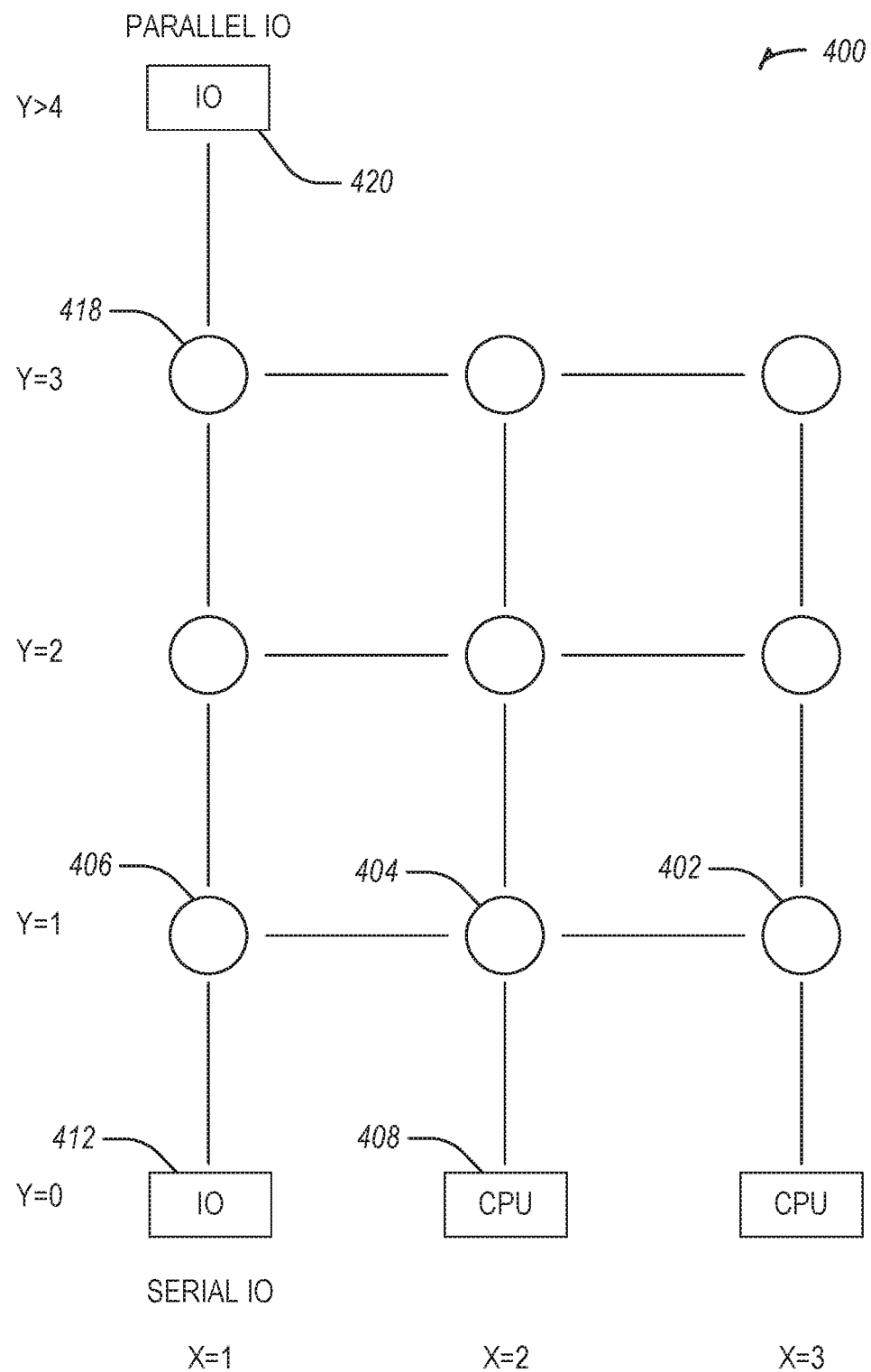
FIG. 4 illustrates a neuromorphic chip connected with CPU and IO components in accordance with some embodiments.

FIG. 4 illustrates a neuromorphic chip 400 connected with CPU 408 and IO components (e.g., 420 and 412) in accordance with some embodiments. In an example shown in FIG. 4, the chip 400 is 3 tiles wide, 3 tiles tall. In another example, a chip may be 4×5×4 cores which is 80 cores or 80,000 neurons for a small chip, a 16×16 core for a larger size chip, etc.

In an example, a coordinate space may be identified for the chip 400. For example, may be set as 0 at the bottom of the chip, then y of 4 or greater may be at the top of the chip. The chip 400 may a special connection to each tile in the top row above and a special connection to each tile in the bottom row below the chip 400. For example, the bottom row (e.g., at y=0) is a serial I/O 412, and CPU connections (e.g., 408). The top row may be a parallel I/O 420, which may be used to connect to other cores or CPUs.

The non-neuron cores (e.g., core 418, 406, 404, 402) may be considered followers of their closest tile-leader and participate in its local barrier synchronization. The CPU 408, the serial IO 412, or the parallel IO 420 may follow respective cores that they are connected to in the chip 400. For example, the parallel IO 420 may follow the core 418, the serial IO 412 may follow the core 406, and the CPU 408 may follow the core 404.

In an example, the CPU 408, the parallel IO 420, or the serial IO 412 may have pending management to do while the system is running. The system may deadlock with management access of a core while the core is sending spikes. To avoid the deadlock, the CPU or IO may request an idle phase by marking an outgoing barrier sync tokens with a "preempt" encoding when returning the token to the tile-leader (e.g., for the CPU 408, the tile-leader is core 404). To add the "preempt" encoding, a bit (or two bits) may be used to mark whether the barrier token includes a preemption token. Preemption may act as a reservation by the CPU 408 to prevent the cores from spiking until the sticky preemption bit or bits are removed.

On the next barrier wave-front, any preempt tokens received will cause all harrier tokens sent to propagate the maximum preempt encoding. Then on the downward wave-front when the action is triggered, the core may do a CMD_BARRIER_PREEMPT, which may flush the core pipeline and prevent performance of a next action or prevent advancement of the time-step. The wave-front with the preempt token may clear the preempt sticky bits. In this way, any IO or CPU in the system may cause the next barrier synchronization phase to flush all spike or event message traffic and prevent additional action from the cores.

There may still be spikes in the meshes after the upward and downward wave-fronts with the preempt tokens, such as to the south or east of the CPU 404 (in the example shown in FIG. 4, the core east of the CPU 408 is core 402). If the CPU 408 were to issue management access to core 402 (or in other examples, to another core to the south or east), the management access may pass spike messages or event messages in transit, such as on the P fabric and arrive before spiking is complete. To prevent this issue, the CPU 408 may request a second preempt phase. When that phase returns to the CPU 408, it may know all spiking traffic is out of the mesh, and the mesh is clear to do management of any core. When the CPU 408 is done writing to a core, the CPU 408 may read back from the core to flush the pending writes from the mesh. In another example, the CPU 408 may do a read to all cores to ensure that all writes are flushed from the system. After finishing the management phase, the CPU 408 may send a non-preempt barrier token to the tile-leader (e.g., core 404) to start the next phase as a normal one. A CPU (e.g., 408) may freely communicate with another CPU at any time using reads, writes, or spike messages without first doing a barrier synchronization with preempt tokens.

Figure 5:
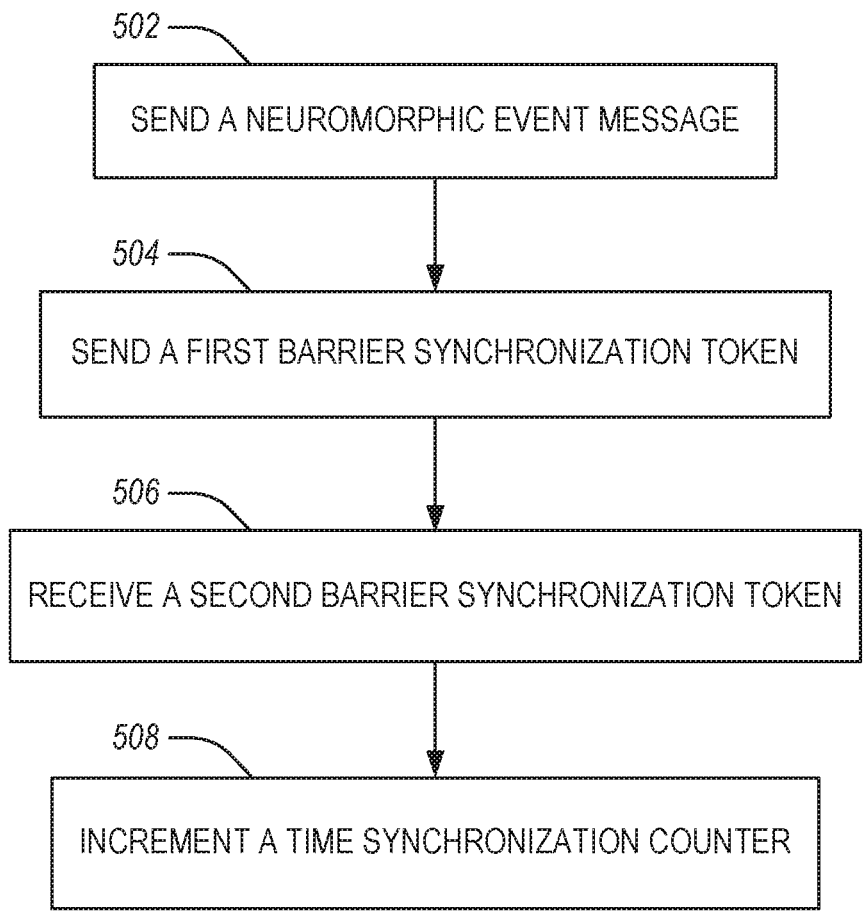
FIG. 5 illustrates a flowchart showing a technique for neuromorphic traffic control to increment time in accordance with some embodiments.

FIG. 5 illustrates a flowchart showing a technique 500 for neuromorphic traffic control to increment time in accordance with some embodiments. The technique 500 includes an operation 502 to send a neuromorphic event message. The neuromorphic event message may be sent from a first leader neuron core to a neighbor neuron core on a mesh. In an example, the first leader neuron core and the neighbor neuron core are cores in a plurality of neuron cores organized in a two-dimensional grid on a chip.

The technique 500 includes an operation 504 to send a first barrier synchronization token. The first barrier synchronization token may be sent from the first leader neuron core, along the mesh to the neighbor neuron core. The technique 500 includes an operation 506 to receive a second barrier synchronization token. The second barrier synchronization token may be received at the first leader neuron core along the mesh from the neighbor neuron core. In an example, the first barrier synchronization token clears northbound and westbound messages, and the second barrier synchronization token clears southbound and eastbound messages on the mesh.

The technique 500 includes an operation 508 to increment a time-step counter. The time-step counter may be incremented in response to receiving the first barrier synchronization token, the second barrier synchronization token, or both. The time-step counter may be located at the first leader core.

The first leader core may be a southernmost and easternmost core in the plurality of neuron cores on the chip. The first barrier synchronization token may be sent to at least two neighbor neuron cores, one of the at least two neighbor neuron cores located one core north of the first leader core and another of the at least two neighbor neuron cores located one core west of the first leader core. The first barrier synchronization token may be sent north to the one and west to another of the at least two neighbor neuron cores. The at least two neighbor neuron cores may forward the barrier synchronization token to subsequent neighbor neuron cores of the plurality of neuron cores. In an example, the barrier synchronization token is to be forwarded by the subsequent neighbor neuron cores until the barrier synchronization token reaches a northernmost and westernmost core in the plurality of neuron cores on the chip. The northernmost and westernmost core may send the second barrier synchronization token along the mesh to neighboring cores of the northernmost and westernmost core in a south and east direction.

In an example, the technique 500 includes receiving, at the first leader core, an event message for a future time before the time-step counter is incremented. The event message for the future time may include a least significant bit set to the future time. In an example, the event message may be saved, such as at the first leader core, for the future time in a register until the future time.

In an example, the technique 500 includes determining, at the first leader core, a set of neuron cores of the plurality of neuron cores with which the first leader core will communicate, and sending, from the first leader core, the first barrier synchronization token along the mesh to only the set of neuron cores. The technique 500 may include estimating the set of neuron cores.

In an example, the technique 500 includes receiving, at the first leader neuron core, a neuromorphic event message originating at a remote neuron core on a second chip. The technique 500 may include forwarding, at a second leader neuron core of the chip, the first barrier synchronization token to the remote neuron core on the second chip. The technique 500 may include receiving, at the second leader neuron core, the second barrier synchronization token from the second chip.

In an example, an edge neuron core of the plurality of neuron cores on an edge of the chip is connected with a central processing unit (CPU). The technique 500 may include receiving, at the edge neuron core from the CPU, an interrupt to stop event messages, and forwarding, at the edge neuron core, the interrupt to other neuron cores in the plurality of neuron cores. In an example, the technique 500 includes receiving, at the edge neuron core from the CPU, a third barrier synchronization token having a preempt encoding before receiving a read message or a write message from the CPU. In response to receiving the read message or the write message, the technique 500 may include receiving, at the edge neuron core, a read message from the CPU to clear any write messages remaining in the mesh. The technique 500 may include receiving, at the edge neuron core from the CPU, a non-preempt barrier token before sending an event message.

Figure 6:
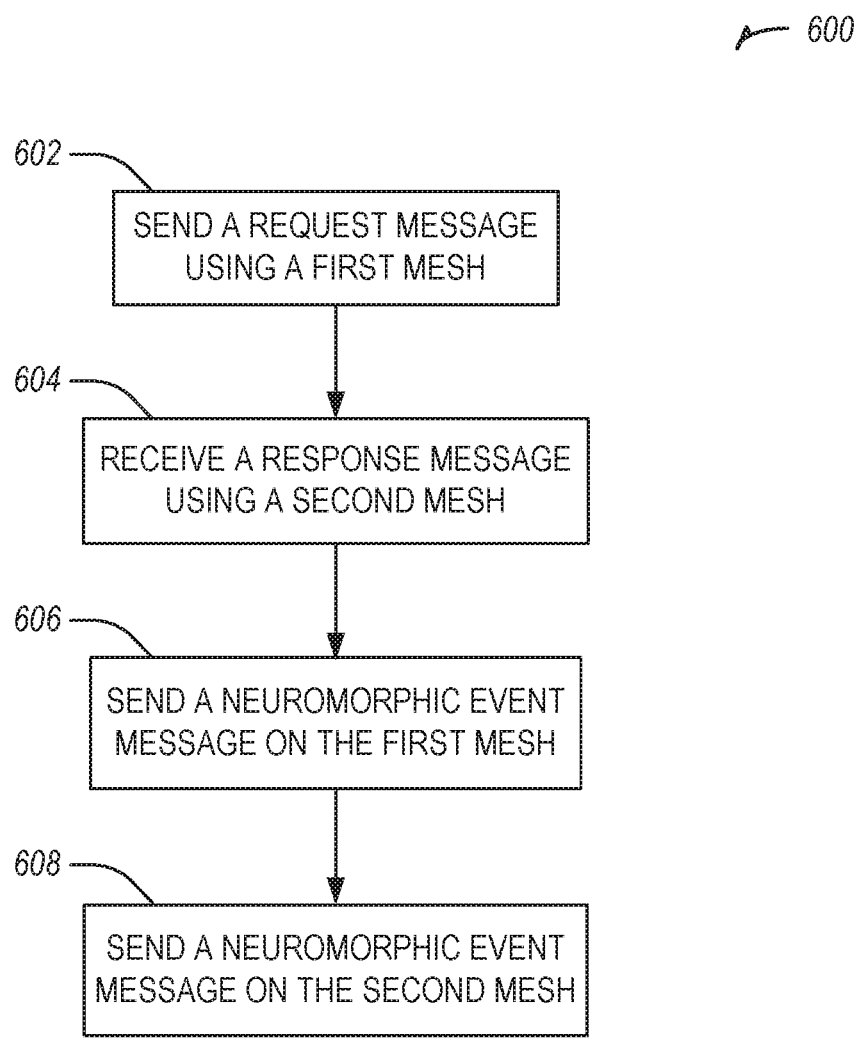
FIG. 6 illustrates a flowchart showing a technique for neuromorphic traffic control with a dual mesh in accordance with some embodiments.

FIG. 6 illustrates a flowchart showing a technique 600 for neuromorphic traffic control with a dual mesh in accordance with some embodiments. The technique 600 includes an operation 602 to send a request message using a first mesh. The request message may be sent from a first neuron core of a plurality of neuron cores, which may be organized in a two-dimensional grid on a chip. The request message may be sent to a second neuron core of the plurality of neuron cores. The request message may include a write message or a read request message.

The technique 600 includes an operation 604 to receive a response message using a second mesh. The response message may be received at the first neuron core from the second neuron core. The response message may use a second mesh connecting the plurality of neuron cores in the two-dimensional grid. The response message may include a read response message. The technique 600 includes an operation 606 to send a neuromorphic event message on the first mesh. The neuromorphic event message may be sent on the first mesh from the first neuron core to the second neuron core.

The technique 600 includes an operation 608 to send a neuromorphic event message on the second mesh. The neuromorphic event message may be sent on the second mesh from the first neuron core to the second neuron core. In an example, messages sent over the first mesh and the second mesh complete movement among the plurality of neuron cores in a first direction before completing movement in a second direction.

In an example, the technique 600 may include sending a neuromorphic event message from the first neuron core to a third neuron core on a second chip organized in a two-dimensional grid with the chip and a plurality of other chips, the two-dimensional grid including a first chip mesh and a second chip mesh for message communication. In an example, write requests and event messages are allowed over the first chip mesh or the second chip mesh and read responses are prevented from being sent over the first chip mesh and the second chip mesh. In an example, the chip and the second chip are arranged in a cross-bar at a port and the port is connected with the plurality of other chips via other ports. In an example, the plurality of other chips are arranged in a three-dimensional grid. In an example, a message sent from the chip to the second chip is includes an address header portion identifying the second chip and a core address portion identifying a neuron core location on the second chip. In an example, after the message reaches the second chip, the address header portion is removed from the message. The neuromorphic event message may be sent on the first mesh within the chip and received on the second mesh on a second chip.

In an example the term "machine readable medium" may include a single medium or multiple media (e.g., a centralized or distributed database, or associated caches and servers) configured to store one or more instructions. The term "machine readable medium" may include any medium that is capable of storing, encoding, or carrying instructions for execution by a machine and that cause the machine to perform any one or more of the techniques of the present disclosure, or that is capable of storing, encoding or carrying data structures used by or associated with such instructions.

Method examples described herein may be machine or computer-implemented at least in part. Some examples may include a computer-readable medium or machine-readable medium encoded with instructions operable to configure an electronic device to perform methods as described above. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMS), read only memories (ROMs), and the like.

Various Notes and Examples

Each of these non-limiting examples may stand on its own, or may be combined in various permutations or combinations with one or more of the other examples.

Example 1 is a system for neuromorphic traffic control, the system comprising: a plurality of routers organized in a mesh to transfer messages; and a plurality of neuron cores connected to the plurality of routers, wherein neuron cores in the plurality of neuron cores: advance in discrete time-steps; send spike messages to other neuron cores in the plurality of neuron cores during a time-step; and send barrier messages, wherein barrier messages sent from the plurality of neuron cores in combination traverse all links of the mesh at the end of a time-step to flush the spike messages out of the plurality of routers and indicate to the plurality of neuron cores that a next time-step has started for the plurality of neuron cores to compute and communicate.

In Example 2, the subject matter of Example 1 optionally includes wherein the plurality of routers are organized in two parallel physical meshes, including the mesh and a second mesh, to send spike messages, the mesh used for read or write request messages and the second mesh used for read response messages.

In Example 3, the subject matter of any one or more of Examples 1-2 optionally include wherein the barrier messages are initiated by an initial neuron core of the plurality of neuron cores of a chip at a corner position of the chip and are sent and received in a barrier synchronization by the plurality of neuron cores along an upward diagonal wavefront to a second neuron core at an opposite corner position, the barrier messages to return as a downward diagonal wavefront to the initial neuron core to flush spike messages out of the mesh.

In Example 4, the subject matter of Example 3 optionally includes wherein the system further comprises a bridge circuit to propagate messages on a second-level inter-chip mesh that connects the plurality of routers on a first chip with a second plurality of routers on a second chip.

In Example 5, the subject matter of Example 4 optionally includes wherein messages sent to the bridge use a request mesh and messages sent from the bridge use a response mesh to avoid cyclic deadlock.

In Example 6, the subject matter of any one or more of Examples 4-5 optionally include wherein barrier messages are exchanged through the second-level inter-chip mesh after the upward diagonal wavefront and before the downward diagonal wavefront of the barrier synchronization to flush messages across multiple chips.

In Example 7, the subject matter of any one or of Examples 3-6 optionally include wherein, in response to the downward diagonal wavefront passing a neuron core of the plurality of neuron cores, the neuron core starts computation at the next time-step.

In Example 8, the subject matter of Example 7 optionally includes bit such that when the spike message is for a future time-step and the spike message passes the downward diagonal wavefront, the receiving neuron core determines that the spike message is intended for the future time-step and stores the spike message for later processing.

In Example 9, the subject matter of any one or more of Examples 1-8 optionally include wherein barrier messages are exchanged between a neuron core of the plurality of neuron cores and a subset of other neuron cores of the plurality of neuron cores, the subset of other neuron cores including neuron cores that the neuron core communicates with directly.

In Example 10, the subject matter of any one or more of Examples 1-9 optionally include wherein barrier messages flush the mesh on a single chip including the plurality of neuron cores, and barrier messages sent on a second-level mesh between the single chip and other chips are only sent between the single chip and a subset of chips that communicate directly.

In Example 11, the subject matter of any one or more of Examples 1-10 optionally include wherein the mesh is arranged in a two-dimensional or a three-dimensional grid.

Example 12 is a method for neuromorphic traffic control, the method comprising: using a plurality of routers organized in a mesh to transfer messages; and using a plurality of neuron cores connected to the plurality of routers to: advance in discrete time-steps; send spike messages to other neuron cores in the plurality of neuron cores during a time-step; and send harrier messages, wherein barrier messages sent from the plurality of neuron cores in combination traverse all links of the mesh at the end of a time-step to flush the spike messages out of the plurality of routers and indicate to the plurality of neuron cores that a next time-step has started for the plurality of neuron cores to compute and communicate.

In Example 13, the subject matter of Example 12 optionally includes wherein the plurality of routers are organized in two parallel physical meshes, including the mesh and a second mesh, to send spike messages, the mesh used for read or write request messages and the second mesh used for read response messages.

In Example 14, the subject matter of any one or more of Examples 12-13 optionally include wherein the barrier messages are initiated by an initial neuron core of the plurality of neuron cores of a chip at a corner position of the chip and are sent and received in a barrier synchronization by the plurality of neuron cores along an upward diagonal wavefront to a second neuron core at an opposite corner position, the barrier messages to return as a downward diagonal wavefront to the initial neuron core to flush spike messages out of the mesh.

In Example 15, the subject matter of Example 14 optionally includes using a bridge circuit to propagate messages on a second-level inter-chip mesh that connects the plurality of routers on a first chip with a second plurality of routers on a second chip.

In Example 16, the subject matter of Example 15 optionally includes wherein messages sent to the bridge use a request mesh and messages sent from the bridge use a response mesh to avoid cyclic deadlock.

In Example 17, the subject matter of any one or more of Examples 15-16 optionally include wherein barrier messages are exchanged through the second-level inter-chip mesh after the upward diagonal wavefront and before the downward diagonal wavefront of the barrier synchronization to flush messages across multiple chips.

In Example 18, the subject matter of any one or more of Examples 14-17 optionally include wherein, in response to the downward diagonal wavefront passing a neuron core of the plurality of neuron cores, the neuron core starts computation at the next time-step.

In Example 19, the subject matter of Example 18 optionally includes bit such that when the spike message is for a future time-step and the spike message passes the downward diagonal wavefront, the receiving neuron core determines that the spike message is intended for the future time-step and stores the spike message for later processing.

In Example 20, the subject matter of any one or more of Examples 12-19 optionally include wherein barrier messages are exchanged between a neuron core of the plurality of neuron cores and a subset of other neuron cores of the plurality of neuron cores, the subset of other neuron cores including neuron cores that the neuron core communicates with directly.

In Example 21, the subject matter of any one or more of Examples 12-20 optionally include wherein barrier messages flush the mesh on a single chip including the plurality of neuron cores, and barrier messages sent on a second-level mesh between the single chip and other chips are only sent between the single chip and a subset of chips that communicate directly.

In Example 22, the subject matter of any one or more of Examples 12-21 optionally include wherein the mesh is arranged in a two-dimensional or a three-dimensional grid.

Example 23 is at least one machine-readable medium including instructions for operation of a computing system, which when executed by a machine, cause the machine to perform operations of any of the methods of Examples 12-22.

Example 24 is an apparatus comprising means for performing any of the methods of Examples 12-22.

Example 25 is an apparatus for neuromorphic traffic control, the apparatus comprising: means for using a plurality of routers organized in a mesh to transfer messages; and means for using a plurality of neuron cores connected to the plurality of routers to: advance in discrete time-steps; send spike messages to other neuron cores in the plurality of neuron cores during a time-step; and send barrier messages, wherein barrier messages sent from the plurality of neuron cores in combination traverse all links of the mesh at the end of a time-step to flush the spike messages out of the plurality of routers and indicate to the plurality of neuron cores that a next time-step has started for the plurality of neuron cores to compute and communicate.

In Example 26, the subject matter of Example 25 optionally includes wherein the plurality of routers are organized in two parallel physical meshes, including the mesh and a second mesh, to send spike messages, the mesh used for read or write request messages and the second mesh used for read response messages.

In Example 27, the subject matter of any one or more of Examples 25-26 optionally include wherein the barrier messages are initiated by an initial neuron core of the plurality of neuron cores of a chip at a corner position of the chip and are sent and received in a barrier synchronization by the plurality of neuron cores along an upward diagonal wavefront to a second neuron core at an opposite corner position, the barrier messages to return as a downward diagonal wavefront to the initial neuron core to flush spike messages out of the mesh.

In Example 28, the subject matter of Example 27 optionally includes means for using a bridge circuit to propagate messages on a second-level inter-chip mesh that connects the plurality of routers on a first chip with a second plurality of routers on a second chip.

In Example 29, the subject matter of Example 28 optionally includes wherein messages sent to the bridge use a request mesh and messages sent from the bridge use a response mesh to avoid cyclic deadlock.

In Example 30, the subject matter of any one or more of Examples 28-29 optionally include wherein barrier messages are exchanged through the second-level inter-chip mesh after the upward diagonal wavefront and before the downward diagonal wavefront of the barrier synchronization to flush messages across multiple chips.

In Example 31, the subject matter of any one or more of Examples 27-30 optionally include wherein, in response to the downward diagonal wavefront passing a neuron core of the plurality of neuron cores, the neuron core starts computation at the next time-step.

In Example 32, the subject matter of Example 31 optionally includes bit such that when the spike message is for a future time-step and the spike message passes the downward diagonal wavefront, the receiving neuron core determines that the spike message is intended for the future time-step and stores the spike message for later processing.

In Example 33, the subject matter of any one or more of Examples 25-32 optionally include wherein barrier messages are exchanged between a neuron core of the plurality of neuron cores and a subset of other neuron cores of the plurality of neuron cores, the subset of other neuron cores including neuron cores that the neuron core communicates with directly.

In Example 34, the subject matter of any one or more of Examples 25-33 optionally include wherein barrier messages flush the mesh on a single chip including the plurality of neuron cores, and barrier messages sent on a second-level mesh between the single chip and other chips are only sent between the single chip and a subset of chips that communicate directly.

In Example 35, the subject matter of any one or more of Examples 25-34 optionally include wherein the mesh is arranged in a two-dimensional or a three-dimensional grid.

Example 36 is at least one machine-readable medium including instructions for neuromorphic traffic control, which when executed by a machine, cause the machine to: use a plurality of routers organized in a mesh to transfer messages; and use a plurality of neuron cores connected to the plurality of routers to: advance in discrete time-steps; send spike messages to other neuron cores in the plurality of neuron cores during a time-step; and send barrier messages, wherein barrier messages sent from the plurality of neuron cores in combination traverse all links of the mesh at the end of a time-step to flush the spike messages out of the plurality of routers and indicate to the plurality of neuron cores that a next time-step has started for the plurality of neuron cores to compute and communicate.

In Example 37, the subject matter of Example 36 optionally includes wherein the plurality of routers are organized in two parallel physical meshes, including the mesh and a second mesh, to send spike messages, the mesh used for read or write request messages and the second mesh used for read response messages.

In Example 38, the subject matter of any one or more of Examples 36-37 optionally include wherein the barrier messages are initiated by an initial neuron core of the plurality of neuron cores of a chip at a corner position of the chip and are sent and received in a barrier synchronization by the plurality of neuron cores along an upward diagonal wavefront to a second neuron core at an opposite corner position, the barrier messages to return as a downward diagonal wavefront to the initial neuron core to flush spike messages out of the mesh.

In Example 39, the subject matter of Example 38 optionally includes instructions to use a bridge circuit to propagate messages on a second-level inter-chip mesh that connects the plurality of routers on a first chip with a second plurality of routers on a second chip.

In Example 40, the subject matter of Example 39 optionally includes wherein messages sent to the bridge use a request mesh and messages sent from the bridge use a response mesh to avoid cyclic deadlock.

In Example 41, the subject matter of any one or more of Examples 39-40 optionally include wherein barrier messages are exchanged through the second-level inter-chip mesh after the upward diagonal wavefront and before the downward diagonal wavefront of the barrier synchronization to flush messages across multiple chips.

In Example 42, the subject matter of any one or more of Examples 38-41 optionally include wherein, in response to the downward diagonal wavefront passing a neuron core of the plurality of neuron cores, the neuron core starts computation at the next time-step.

In Example 43, the subject matter of Example 42 optionally includes bit such that when the spike message is for a future time-step and the spike message passes the downward diagonal wavefront, the receiving neuron core determines that the spike message is intended for the future time-step and stores the spike message for later processing.

In Example 44, the subject matter of any one or more of Examples 36-43 optionally include wherein barrier messages are exchanged between a neuron core of the plurality of neuron cores and a subset of other neuron cores of the plurality of neuron cores, the subset of other neuron cores including neuron cores that the neuron core communicates with directly.

In Example 45, the subject matter of any one or more of Examples 36-44 optionally include wherein barrier messages flush the mesh on a single chip including the plurality of neuron cores, and barrier messages sent on a second-level mesh between the single chip and other chips are only sent between the single chip and a subset of chips that communicate directly.

In Example 46, the subject matter of any one or more of Examples 36-45 optionally include wherein the mesh is arranged in a two-dimensional or a three-dimensional grid.

Example 47 is a system for neuromorphic traffic control, the system comprising: a plurality of neuron cores organized on a chip to send and receive neuromorphic event messages; a mesh connecting the plurality of neuron cores and used to send and receive the neuromorphic event messages, the mesh including a network of routers organized as a grid with nearest-neighbor connectivity among routers of the network of routers; and a first core of the plurality of neuron cores to: send a first barrier synchronization token along the mesh to a neighbor neuron core in the plurality of neuron cores; receive a second barrier synchronization token along the mesh from the neighbor neuron core; and increment, in response to receiving the second barrier synchronization token, a time-step counter of the first core.

In Example 48, the subject matter of Example 47 optionally includes wherein the first core is a southernmost and easternmost core in the plurality of neuron cores on the chip.

In Example 49, the subject matter of Example 48 optionally includes wherein the first barrier synchronization token is sent to at least two neighbor neuron cores, one of the at least two neighbor neuron cores located one core north of the first core and another of the at least two neighbor neuron cores located one core west of the first core, and wherein the first barrier synchronization token is sent north to the one and west to the another of the at least two neighbor neuron cores.

In Example 50, the subject matter of Example 49 optionally includes wherein the at least two neighbor neuron cores are to forward the barrier synchronization token to subsequent neighbor neuron cores of the plurality of neuron cores, and wherein the barrier synchronization token is to be forwarded by the subsequent neighbor neuron cores until the barrier synchronization token reaches a northernmost and westernmost core in the plurality of neuron cores on the chip.

In Example 51, the subject matter of Example 50 optionally includes wherein the northernmost and westernmost core is to send the second barrier synchronization token along the mesh to neighboring cores of the northernmost and westernmost core in a south and east direction.

In Example 52, the subject matter of any one or more of Examples 47-51 optionally include wherein the first barrier synchronization token clears northbound and westbound messages, and the second barrier synchronization token clears southbound and eastbound messages on the mesh.

In Example 53, the subject matter of any one or more of Examples 47-52 optionally include wherein the first core receives an event message for a future time before the time-step counter is incremented.

In Example 54, the subject matter of Example 53 optionally includes wherein the event message for the future time includes a least significant bit set to the future time such that when the event message is for the future time and the event message passes the second barrier synchronization token, the first core determines that the event message is intended for the future time and stores the event message for later processing.

In Example 55, the subject matter of any one or more of Examples 47-54 optionally include wherein the first core is further to determine a set of neuron cores of the plurality of neuron cores with which the first core will communicate, and send the first barrier synchronization token along the mesh to only the set of neuron cores.

In Example 56, the subject matter of any one or more of Examples 47-55 optionally include wherein the mesh is arranged in a two-dimensional or three-dimensional grid.

In Example 57, the subject matter of any one or more of Examples 47-56 optionally include wherein the system further comprises a plurality of neuron cores organized on a second chip to send and receive neuromorphic event messages, the second chip connected via a second mesh of routers, the second mesh of routers connecting a neuron core grid of respective chips via a port.

In Example 58, the subject matter of Example 57 optionally includes wherein a second core of the chip is a leader core that is to forward the first barrier synchronization token to a remote leader core of the second chip and receive the second barrier synchronization token from the remote leader core of the second chip.

In Example 59, the subject matter of any one or more of Examples 47-58 optionally include wherein an edge neuron core of the plurality of neuron cores on an edge of the chip is connected with a central processing unit (CPU).

In Example 60, the subject matter of Example 59 optionally includes wherein the edge neuron core is to receive, from the CPU, an interrupt to the to stop event messages, the edge neuron core to forward the interrupt to other neuron cores in the plurality of neuron cores.

In Example 61, the subject matter of any one or more of Examples 59-60 optionally include wherein the edge neuron core is to receive, from the CPU, a third barrier synchronization token having a preempt encoding before receiving a read message or a write message from the CPU.

In Example 62, the subject matter of any one or more of Examples 59-61 optionally include wherein after receiving the read message or the write message, the edge neuron core is to receive a read message from the CPU to clear any write messages remaining in the mesh.

In Example 63, the subject matter of any one or more of Examples 59-62 optionally include wherein the edge neuron core is to receive, from the CPU, a non-preempt barrier token before sending an event message.

Example 64 is a method for neuromorphic traffic control, the method comprising: sending a neuromorphic event message from a first neuron core to a neighbor neuron core on a mesh including a network of routers organized as a grid, the first neuron core and the neighbor neuron core being cores in a plurality of neuron cores organized on a chip; sending, from the first neuron core, a first barrier synchronization token along the mesh to the neighbor neuron core; receiving, at the first neuron core, a second barrier synchronization token along the mesh from the neighbor neuron core; and incrementing, in response to receiving the second barrier synchronization token, a time-step counter at the first core.

In Example 65, the subject matter of Example 64 optionally includes wherein the first core is a southernmost and easternmost core in the plurality of neuron cores on the chip.

In Example 66, the subject matter of Example 65 optionally includes wherein the first barrier synchronization token is sent to at least two neighbor neuron cores, one of the at least two neighbor neuron cores located one core north of the first core and another of the at least two neighbor neuron cores located one core west of the first core, and wherein the first barrier synchronization token is sent north to the one and west to the another of the at least two neighbor neuron cores.

In Example 67, the subject matter of Example 66 optionally includes wherein the at least two neighbor neuron cores are to forward the barrier synchronization token to subsequent neighbor neuron cores of the plurality of neuron cores, and wherein the barrier synchronization token is to be forwarded by the subsequent neighbor neuron cores until the barrier synchronization token reaches a northernmost and westernmost core in the plurality of neuron cores on the chip.

In Example 68, the subject matter of Example 67 optionally includes wherein the northernmost and westernmost core is to send the second barrier synchronization token along the mesh to neighboring cores of the northernmost and westernmost core in a south and east direction.

In Example 69, the subject matter of any one or more of Examples 64-68 optionally include wherein the first barrier synchronization token clears northbound and westbound messages, and the second barrier synchronization token clears southbound and eastbound messages on the mesh.

In Example 70, the subject matter of any one or more of Examples 64-69 optionally include receiving, at the first core, an event message for a future time before the time-step counter is incremented.

In Example 71, the subject matter of Example 70 optionally includes wherein the event message for the future time includes a least significant bit set to the future time such that when the event message is for the future time and the event message passes the second barrier synchronization token, the first core determines that the event message is intended for the future time and stores the event message for later processing.

In Example 72, the subject matter of any one or more of Examples 64-71 optionally include determining, at the first core, a set of neuron cores of the plurality of neuron cores with which the first core will communicate, and sending, from the first core, the first barrier synchronization token along the mesh to only the set of neuron cores.

In Example 73, the subject matter of any one or more of Examples 64-72 optionally include wherein the mesh is arranged in a two-dimensional or three-dimensional grid.

In Example 74, the subject matter of any one or more of Examples 64-73 optionally include receiving, at the first neuron core, a neuromorphic event message originating at a remote neuron core on a second chip, the second chip connected via a second mesh of routers, the second mesh of routers connecting a neuron core grid of respective chips via a port.

In Example 75, the subject matter of Example 74 optionally includes forwarding, at a second neuron core of the chip which is a leader core, the first barrier synchronization token to the remote neuron core on the second chip and receiving, at the second neuron core, the second barrier synchronization token from the second chip.

In Example 76, the subject matter of any one or more of Examples 64-75 optionally include wherein an edge neuron core of the plurality of neuron cores on an edge of the chip is connected with a central processing unit (CPU).

In Example 77, the subject matter of Example 76 optionally includes receiving, at the edge neuron core from the CPU, an interrupt to the to stop event messages, and forwarding, at the edge neuron core, the interrupt to other neuron cores in the plurality of neuron cores.

In Example 78, the subject matter of any one or more of Examples 76-77 optionally include receiving, at the edge neuron core from the CPU, a third barrier synchronization token having a preempt encoding before receiving a read message or a write message from the CPU.

In Example 79, the subject matter of any one or more of Examples 76-78 optionally include in response to receiving the read message or the write message, receiving, at the edge neuron core, a read message from the CPU to clear any write messages remaining in the mesh.

In Example 80, the subject matter of any one or more of Examples 76-79 optionally include receiving, at the edge neuron core from the CPU, a non-preempt barrier token before sending an event message.

Example 81 is at least one machine-readable medium including instructions for operation of a computing system, which when executed by a machine, cause the machine to perform operations of any of the methods of Examples 64-80.

Example 82 is an apparatus comprising means for performing any of the methods of Examples 64-80.

Example 83 is at least one machine-readable medium including instructions for neuromorphic traffic control, which when executed by a machine, cause the machine to: send a neuromorphic event message from a first neuron core to a neighbor neuron core on a mesh including a network of routers organized as a grid, the first neuron core and the neighbor neuron core being cores in a plurality of neuron cores organized on a chip; send, from the first neuron core, a first barrier synchronization token along the mesh to the neighbor neuron core; receive, at the first neuron core, a second barrier synchronization token along the mesh from the neighbor neuron core; and increment, in response to receiving the second barrier synchronization token, a time-step counter at the first core.

In Example 84, the subject matter of Example 83 optionally includes wherein the first core is a southernmost and easternmost core in the plurality of neuron cores on the chip.

In Example 85, the subject matter of Example 84 optionally includes wherein the first barrier synchronization token is sent to at least two neighbor neuron cores, one of the at least two neighbor neuron cores located one core north of the first core and another of the at least two neighbor neuron cores located one core west of the first core, and wherein the first barrier synchronization token is sent north to the one and west to the another of the at least two neighbor neuron cores.

In Example 86, the subject matter of Example 85 optionally includes wherein the at least two neighbor neuron cores are to forward the barrier synchronization token to subsequent neighbor neuron cores of the plurality of neuron cores, and wherein the barrier synchronization token is to be forwarded by the subsequent neighbor neuron cores until the barrier synchronization token reaches a northernmost and westernmost core in the plurality of neuron cores on the chip.

In Example 87, the subject matter of Example 86 optionally includes wherein the northernmost and westernmost core is to send the second barrier synchronization token along the mesh to neighboring cores of the northernmost and westernmost core in a south and east direction.

In Example 88, the subject matter of any one or more of Examples 83-87 optionally include wherein the first barrier synchronization token clears northbound and westbound messages, and the second barrier synchronization token clears southbound and eastbound messages on the mesh.

In Example 89, the subject matter of any one or more of Examples 83-88 optionally include instructions to receive, at the first core, an event message for a future time before the time-step counter is incremented.

In Example 90, the subject matter of Example 89 optionally includes wherein the event message for the future time includes a least significant bit set to the future time such that when the event message is for the future time and the event message passes the second barrier synchronization token, the first core determines that the event message is intended for the future time and stores the event message for later processing.

In Example 91, the subject matter of any one or more of Examples 83-90 optionally include instructions to determine, at the first core, a set of neuron cores of the plurality of neuron cores with which the first core will communicate, and sending, from the first core, the first barrier synchronization token along the mesh to only the set of neuron cores.

In Example 92, the subject matter of any one or more of Examples 83-91 optionally include wherein the mesh is arranged in a two-dimensional or three-dimensional grid.

In Example 93, the subject matter of any one or more of Examples 8-92 optionally include instructions to receive, at the first neuron core, a neuromorphic event message originating at a remote neuron core on a second chip, the second chip connected via a second mesh of routers, the second mesh of routers connecting a neuron core grid of respective chips via a port.

In Example 94, the subject matter of Example 93 optionally includes instructions to forward, at a second neuron core of the chip which is a leader core, the first barrier synchronization token to the remote neuron core on the second chip and receiving, at the second neuron core, the second barrier synchronization token from the second chip.

In Example 95, the subject matter of any one or more of Examples 83-94 optionally include wherein an edge neuron core of the plurality of neuron cores on an edge of the chip is connected with a central processing unit (CPU).

In Example 96, the subject matter of Example 95 optionally includes instructions to receive, at the edge neuron core from the CPU, an interrupt to the to stop event messages, and forwarding, at the edge neuron core, the interrupt to other neuron cores in the plurality of neuron cores.

In Example 97, the subject matter of any one or more of Examples 95-96 optionally include instructions to receive, at the edge neuron core from the CPU, a third barrier synchronization token having a preempt encoding before receiving a read message or a write message from the CPU.

In Example 98, the subject matter of any one or more of Examples 95-97 optionally include in response to receiving the read message or the write message, instructions to receive, at the edge neuron core, a read message from the CPU to clear any write messages remaining in the mesh.

In Example 99, the subject matter of any one or more of Examples 95-98 optionally include instructions to receive, at the edge neuron core from the CPU, a non-preempt barrier token before sending an event message.

Example 100 is an apparatus for neuromorphic traffic control, the apparatus comprising: means for sending a neuromorphic event message from a first neuron core to a neighbor neuron core on a mesh including a network of routers organized as a grid, the first neuron core and the neighbor neuron core being cores in a plurality of neuron cores organized on a chip; means for sending, from the first neuron core, a first barrier synchronization token along the mesh to the neighbor neuron core; means for receiving, at the first neuron core, a second barrier synchronization token along the mesh from the neighbor neuron core; and means for incrementing, in response to receiving the second barrier synchronization token, a time-step counter at the first core.

In Example 101, the subject matter of Example 100 optionally includes wherein the first core is a southernmost and easternmost core in the plurality of neuron cores on the chip.

In Example 102, the subject matter of Example 101 optionally includes wherein the first barrier synchronization token is sent to at least two neighbor neuron cores, one of the at least two neighbor neuron cores located one core north of the first core and another of the at least two neighbor neuron cores located one core west of the first core, and wherein the first barrier synchronization token is sent north to the one and west to the another of the at least two neighbor neuron cores.

In Example 103, the subject matter of Example 102 optionally includes wherein the at least two neighbor neuron cores are to forward the barrier synchronization token to subsequent neighbor neuron cores of the plurality of neuron cores, and wherein the barrier synchronization token is to be forwarded by the subsequent neighbor neuron cores until the barrier synchronization token reaches a northernmost and westernmost core in the plurality of neuron cores on the chip.

In Example 104, the subject matter of Example 103 optionally includes wherein the northernmost and westernmost core is to send the second barrier synchronization token along the mesh to neighboring cores of the northernmost and westernmost core in a south and east direction.

In Example 105, the subject matter of any one or more of Examples 100-104 optionally include wherein the first barrier synchronization token clears northbound and westbound messages, and the second barrier synchronization token clears southbound and eastbound messages on the mesh.

In Example 106, the subject matter of any one or more of Examples 100-105 optionally include means for receiving, at the first core, an event message for a future time before the time-step counter is incremented.

In Example 107, the subject matter of Example 106 optionally includes wherein the event message for the future time includes a least significant bit set to the future time such that when the event message is for the future time and the event message passes the second barrier synchronization token, the first core determines that the event message is intended for the future time and stores the event message for later processing.

In Example 108, the subject matter of any one or more of Examples 100-107 optionally include means for determining, at the first core, a set of neuron cores of the plurality of neuron cores with which the first core will communicate, and sending, from the first core, the first barrier synchronization token along the mesh to only the set of neuron cores.

In Example 109, the subject matter of any one or more of Examples 100-108 optionally include wherein the mesh is arranged in a two-dimensional or three-dimensional grid.

In Example 110, the subject matter of any one or more of Examples 100-109 optionally include means for receiving, at the first neuron core, a neuromorphic event message originating at a remote neuron core on a second chip, the second chip connected via a second mesh of routers, the second mesh of routers connecting a neuron core grid of respective chips via a port.

In Example 111, the subject matter of Example 110 optionally includes means for forwarding, at a second neuron core of the chip which is a leader core, the first barrier synchronization token to the remote neuron core on the second chip and receiving, at the second neuron core, the second barrier synchronization token from the second chip.

In Example 112, the subject matter of any one or more of Examples 100-111 optionally include wherein an edge neuron core of the plurality of neuron cores on an edge of the chip is connected with a central processing unit (CPU).

In Example 113, the subject matter of Example 112 optionally includes means for receiving, at the edge neuron core from the CPU, an interrupt to the to stop event messages, and forwarding, at the edge neuron core, the interrupt to other neuron cores in the plurality of neuron cores.

In Example 114, the subject matter of any one or more of Examples 112-113 optionally include means for receiving, at the edge neuron core from the CPU, a third barrier synchronization token having a preempt encoding before receiving a read message or a write message from the CPU.

In Example 115, the subject matter of any one or more of Examples 112-114 optionally include in response to receiving the read message or the write message, means for receiving, at the edge neuron core, a read message from the CPU to clear any write messages remaining in the mesh.

In Example 116, the subject matter of any one or more of Examples 112-115 optionally include means for receiving, at the edge neuron core from the CPU, a non-preempt barrier token before sending an event message.

Example 117 is a system for neuromorphic traffic control, the system comprising: a plurality of neuron cores organized in a two-dimensional grid on a chip to send and receive neuromorphic event messages; a first mesh connecting the plurality of neuron cores in the two-dimensional grid, the first mesh used to send and receive request messages; a second mesh connecting the plurality of neuron cores in the two-dimensional grid, the second mesh used to send and receive response messages; and wherein the neuromorphic event messages are sent and received on both the first mesh and the second mesh.

In Example 118, the subject matter of Example 117 optionally includes wherein the request messages include a write message or a read request message.

In Example 119, the subject matter of any one or more of Examples 117-118 optionally include wherein the response messages include a read response message.

In Example 120, the subject matter of any one or more of Examples 117-119 optionally include wherein messages sent over the first mesh and the second mesh complete movement among the plurality of neuron cores in a first direction before completing movement in a second direction.

In Example 121, the subject matter of any one or more of Examples 117-120 optionally include a second chip organized in a two-dimensional grid with the chip and a plurality of other chips, the two-dimensional grid including a first chip mesh and a second chip mesh for message communication.

In Example 122, the subject matter of Example 121 optionally includes wherein write requests and event messages are allowed over the first chip mesh or the second chip mesh and read responses are prevented from being sent over the first chip mesh and the second chip mesh.

In Example 123, the subject matter of any one or more of Examples 121-122 optionally include wherein the chip and the second chip are arranged in a cross-bar at a port and the port is connected with the plurality of other chips via other ports.

In Example 124, the subject matter of any one or more of Examples 121-123 optionally include wherein the plurality of other chips are arranged in a three-dimensional grid.

In Example 125, the subject matter of any one or more of Examples 121-124 optionally include wherein a message sent from the chip to the second chip is includes an address header portion identifying the second chip and a core address portion identifying a neuron core location on the second chip.

In Example 126, the subject matter of Example 125 optionally includes wherein after the message reaches the second chip, the address header portion is removed from the message.

In Example 127, the subject matter of any one or more of Examples 117-126 optionally include wherein a neuromorphic event message includes a carrier token when the neuromorphic event message is addressed to a neuron core outside the chip.

In Example 128, the subject matter of Example 127 optionally includes wherein the neuromorphic event message is sent on the first mesh within the chip and received on the second mesh on a second chip.

Example 129 is a method for neuromorphic traffic control, the method comprising: sending, from a first neuron core of a plurality of neuron cores organized in a two-dimensional grid on a chip to a second neuron core of the plurality of neuron cores, a request message using a first mesh connecting the plurality of neuron cores in the two-dimensional grid; receiving, at the first neuron core from the second neuron core, a response message using a second mesh connecting the plurality of neuron cores in the two-dimensional grid; sending a neuromorphic event message the first neuron core to the second neuron core on the first mesh; and sending a neuromorphic event message from the first neuron core to the second neuron core on the second mesh.

In Example 130, the subject matter of Example 129 optionally includes wherein the request message includes a write message or a read request message.

In Example 131, the subject matter of any one or more of Examples 129-130 optionally include wherein the response message include a read response message.

In Example 132, the subject matter of any one or more of Examples 129-131 optionally include wherein messages sent over the first mesh and the second mesh complete movement among the plurality of neuron cores in a first direction before completing movement in a second direction.

In Example 133, the subject matter of any one or more of Examples 129-132 optionally include sending a neuromorphic event message from the first neuron core to a third neuron core on a second chip organized in a two-dimensional grid with the chip and a plurality of other chips, the two-dimensional grid including a first chip mesh and a second chip mesh for message communication.

In Example 134, the subject matter of Example 133 optionally includes wherein write requests and event messages are allowed over the first chip mesh or the second chip mesh and read responses are prevented from being sent over the first chip mesh and the second chip mesh.

In Example 135, the subject matter of any one or more of Examples 133-134 optionally include wherein the chip and the second chip are arranged in a cross-bar at a port and the port is connected with the plurality of other chips via other ports.

In Example 136, the subject matter of any one or more of Examples 133-135 optionally include wherein the plurality of other chips are arranged in a three-dimensional grid.

In Example 137, the subject matter of any one or more of Examples 133-136 optionally include wherein a message sent from the chip to the second chip is includes an address header portion identifying the second chip and a core address portion identifying a neuron core location on the second chip.

In Example 138, the subject matter of Example 137 optionally includes wherein after the message reaches the second chip, the address header portion is removed from the message.

In Example 139, the subject matter of any one or more of Examples 129-138 optionally include wherein a neuromorphic event message includes a carrier token when the neuromorphic event message is addressed to a neuron core outside the chip.

In Example 140, the subject matter of Example 139 optionally includes wherein the neuromorphic event message is sent on the first mesh within the chip and received on the second mesh on a second chip.

Example 141 is at least one machine-readable medium including instructions for operation of a computing system, which when executed by a machine, cause the machine to perform operations of any of the methods of Examples 129-140.

Example 142 is an apparatus comprising means for performing any of the methods of Examples 129-140.

Example 143 is at least one machine-readable medium including instructions for neuromorphic traffic control, which when executed by a machine, cause the machine to: send, from a first neuron core of a plurality of neuron cores organized in a two-dimensional grid on a chip to a second neuron core of the plurality of neuron cores, a request message using a first mesh connecting the plurality of neuron cores in the two-dimensional grid; receive, at the first neuron core from the second neuron core, a response message using a second mesh connecting the plurality of neuron cores in the two-dimensional grid; send a neuromorphic event message the first neuron core to the second neuron core on the first mesh; and send a neuromorphic event message from the first neuron core to the second neuron core on the second mesh.

In Example 144, the subject matter of Example 143 optionally includes wherein the request message includes a write message or a read request message.

In Example 145, the subject matter of any one or more of Examples 143-144 optionally include wherein the response message include a read response message.

In Example 146, the subject matter of any one or more of Examples 143-145 optionally include wherein messages sent over the first mesh and the second mesh complete movement among the plurality of neuron cores in a first direction before completing movement in a second direction.

In Example 147, the subject matter of any one or more of Examples 143-146 optionally include instructions to send a neuromorphic event message from the first neuron core to a third neuron core on a second chip organized in a two-dimensional grid with the chip and a plurality of other chips, the two-dimensional grid including a first chip mesh and a second chip mesh for message communication.

In Example 148, the subject matter of Example 147 optionally includes wherein write requests and event messages are allowed over the first chip mesh or the second chip mesh and read responses are prevented from being sent over the first chip mesh and the second chip mesh.

In Example 149, the subject matter of any one or more of Examples 147-148 optionally include wherein the chip and the second chip are arranged in a cross-bar at a port and the port is connected with the plurality of other chips via other ports.

In Example 150, the subject matter of any one or more of Examples 147-149 optionally include wherein the plurality of other chips are arranged in a three-dimensional grid.

In Example 151, the subject matter of any one or more of Examples 147-150 optionally include wherein a message sent from the chip to the second chip is includes an address header portion identifying the second chip and a core address portion identifying a neuron core location on the second chip.

In Example 152, the subject matter of Example 151 optionally includes wherein after the message reaches the second chip, the address header portion is removed from the message.

In Example 153, the subject matter of any one or more of Examples 143-152 optionally include wherein a neuromorphic event message includes a carrier token when the neuromorphic event message is addressed to a neuron core outside the chip.

In Example 154, the subject matter of Example 153 optionally includes wherein the neuromorphic event message is sent on the first mesh within the chip and received on the second mesh on a second chip.

Example 155 is an apparatus for neuromorphic traffic control, the apparatus comprising: means for sending, from a first neuron core of a plurality of neuron cores organized in a two-dimensional grid on a chip to a second neuron core of the plurality of neuron cores, a request message using a first mesh connecting the plurality of neuron cores in the two-dimensional grid; means for receiving, at the first neuron core from the second neuron core, a response message using a second mesh connecting the plurality of neuron cores in the two-dimensional grid; means for sending a neuromorphic event message the first neuron core to the second neuron core on the first mesh; and means for sending a neuromorphic event message from the first neuron core to the second neuron core on the second mesh.

In Example 156, the subject matter of Example 155 optionally includes wherein the request message includes a write message or a read request message.

In Example 157, the subject matter of any one or more of Examples 155-156 optionally include wherein the response message include a read response message.

In Example 158, the subject matter of any one or more of Examples 155-157 optionally include wherein messages sent over the first mesh and the second mesh complete movement among the plurality of neuron cores in a first direction before completing movement in a second direction.

In Example 159, the subject matter of any one or more of Examples 155-158 optionally include means for sending a neuromorphic event message from the first neuron core to a third neuron core on a second chip organized in a two-dimensional grid with the chip and a plurality of other chips, the two-dimensional grid including a first chip mesh and a second chip mesh for message communication.

In Example 160, the subject matter of Example 159 optionally includes wherein write requests and event messages are allowed over the first chip mesh or the second chip mesh and read responses are prevented from being sent over the first chip mesh and the second chip mesh.

In Example 161, the subject matter of any one or more of Examples 159-160 optionally include wherein the chip and the second chip are arranged in a cross-bar at a port and the port is connected with the plurality of other chips via other ports.

In Example 162, the subject matter of any one or more of Examples 159-161 optionally include wherein the plurality of other chips are arranged in a three-dimensional grid.

In Example 163, the subject matter of any one or more of Examples 159-162 optionally include wherein a message sent from the chip to the second chip is includes an address header portion identifying the second chip and a core address portion identifying a neuron core location on the second chip.

In Example 164, the subject matter of Example 163 optionally includes wherein after the message reaches the second chip, the address header portion is removed from the message.

In Example 165, the subject matter of any one or more of Examples 155-164 optionally include wherein a neuromorphic event message includes a carrier token when the neuromorphic event message is addressed to a neuron core outside the chip.

In Example 166, the subject matter of Example 165 optionally includes wherein the neuromorphic event message is sent on the first mesh within the chip and received on the second mesh on a second chip.

What is claimed is:

1. A system for neuromorphic traffic control, the system comprising:
   a plurality of routers organized in a mesh to transfer messages; and
   a plurality of neuron cores connected to the plurality of routers, wherein neuron cores in the plurality of neuron cores:
   advance in discrete time-steps;
   send spike messages to other neuron cores in the plurality of neuron cores during a time-step; and
   send barrier messages, wherein barrier messages sent from the plurality of neuron cores in combination traverse all links of the mesh at the end of a time-step to flush the spike messages out of the plurality of routers and indicate to the plurality of neuron cores that a next time-step has started for the plurality of neuron cores to compute and communicate;
   wherein the barrier messages are initiated by an initial neuron core of the plurality of neuron cores and are sent and received in a barrier synchronization operation by the plurality of neuron cores along a wavefront to a second neuron core, the barrier messages to return as a second wavefront to the initial neuron core to flush spike messages out of the mesh.

2. The system of claim 1, wherein the plurality of routers are organized in two parallel physical meshes, including the mesh and a second mesh, to send spike messages, the mesh used for read or write request messages and the second mesh used for read response messages.

3. The system of claim 1, wherein the initial neuron core of the plurality of neuron cores is on a chip at a corner position of the chip, wherein the wavefront is an upward diagonal wavefront to the second neuron core at an opposite corner position, and wherein the second wavefront is a downward diagonal wavefront.

4. The system of claim 3, wherein the system further comprises a bridge circuit to propagate messages on a second-level inter-chip mesh that connects the plurality of routers on a first chip with a second plurality of routers on a second chip.

5. The system of claim 4, wherein messages sent to the bridge use a request mesh and messages sent from the bridge use a response mesh to avoid cyclic deadlock.

6. The system of claim 4, wherein barrier messages are exchanged through the second-level inter-chip mesh after the upward diagonal wavefront and before the downward diagonal wavefront of the barrier synchronization to flush messages across multiple chips.

7. The system of claim 3, wherein, in response to the downward diagonal wavefront passing a neuron core of the plurality of neuron cores, the neuron core starts computation at the next time-step.

8. The system of claim 7, wherein a spike message sent by the neuron core to a receiving neuron core of the plurality of cores includes a time-stamp of at least 1 bit such that when the spike message is for a future time-step and the spike message passes the downward diagonal wavefront, the receiving neuron core determines that the spike message is intended for the future time-step and stores the spike message for later processing.

9. The system of claim 1, wherein barrier messages are exchanged between a neuron core of the plurality of neuron cores and a subset of other neuron cores of the plurality of neuron cores, the subset of other neuron cores including neuron cores that the neuron core communicates with directly.

10. The system of claim 1, wherein barrier messages flush the mesh on a single chip including the plurality of neuron cores, and barrier messages sent on a second-level mesh between the single chip and other chips are only sent between the single chip and a subset of chips that communicate directly.

11. The system of claim 1, wherein the mesh is arranged in a two-dimensional or a three-dimensional grid.

12. A method for neuromorphic traffic control, the method comprising:
   using a plurality of routers organized in a mesh to transfer messages; and
   using a plurality of neuron cores connected to the plurality of routers to:
   advance in discrete time-steps;
   send spike messages to other neuron cores in the plurality of neuron cores during a time-step;
   send barrier messages, wherein barrier messages sent from the plurality of neuron cores in combination traverse all links of the mesh at the end of a time-step to flush the spike messages out of the plurality of routers and indicate to the plurality of neuron cores that a next time-step has started for the plurality of neuron cores to compute and communicate; and
   using an initial neuron core of the plurality of neuron cores to initiate the barrier messages, which are sent and received in a barrier synchronization operation by the plurality of neuron cores along a wavefront to a second neuron core, the barrier messages returning as a second wavefront to the initial neuron core to flush spike messages out of the mesh.

13. The method of claim 12, wherein the plurality of routers are organized in two parallel physical meshes, including the mesh and a second mesh, to send spike messages, the mesh used for read or write request messages and the second mesh used for read response messages.

14. The method of claim 12, wherein barrier messages are exchanged between a neuron core of the plurality of neuron cores and a subset of other neuron cores of the plurality of neuron cores, the subset of other neuron cores including neuron cores that the neuron core communicates with directly.

15. At least one non-transitory machine-readable medium including instructions for neuromorphic traffic control, which when executed by a machine, cause the machine to:
   use a plurality of routers organized in a mesh to transfer messages; and
   use a plurality of neuron cores connected to the plurality of routers to:
   advance in discrete time-steps;
   send spike messages to other neuron cores in the plurality of neuron cores during a time-step;
   send barrier messages, wherein barrier messages sent from the plurality of neuron cores in combination traverse all links of the mesh at the end of a time-step to flush the spike messages out of the plurality of routers and indicate to the plurality of neuron cores that a next time-step has started for the plurality of neuron cores to compute and communicate; and
   use an initial neuron core of the plurality of neuron cores to initiate the barrier messages, which are sent and received in a barrier synchronization operation by the plurality of neuron cores along a wavefront to a second neuron core, and wherein the barrier messages are returned as a second wavefront to the initial neuron core to flush spike messages out of the mesh.

16. The at least one machine readable medium of claim 15, wherein the plurality of routers are organized in two parallel physical meshes, including the mesh and a second mesh, to send spike messages, the mesh used for read or write request messages and the second mesh used for read response messages.

17. The at least one machine readable medium of claim 15, wherein the initial neuron core of the plurality of neuron cores is on a chip at a corner position of the chip, wherein the wavefront is an upward diagonal wavefront to the second neuron core at an opposite corner position, and wherein the second wavefront is a downward diagonal wavefront.

18. The at least one machine readable medium of claim 17, further comprising instructions to use a bridge circuit to propagate messages on a second-level inter-chip mesh that connects the plurality of routers on a first chip with a second plurality of routers on a second chip.

19. The at least one machine readable medium of claim 18, wherein messages sent to the bridge use a request mesh and messages sent from the bridge use a response mesh to avoid cyclic deadlock.

20. The at least one machine readable medium of claim 18, wherein barrier messages are exchanged through the second-level inter-chip mesh after the upward diagonal wavefront and before the downward diagonal wavefront of the barrier synchronization to flush messages across multiple chips.

21. The at least one machine readable medium of claim 17, wherein, in response to the downward diagonal wavefront passing a neuron core of the plurality of neuron cores, the neuron core starts computation at the next time-step.

22. The at least one machine readable medium of claim 21, wherein a spike message sent by the neuron core to a receiving neuron core of the plurality of cores includes a time-stamp of at least 1 bit such that when the spike message is for a future time-step and the spike message passes the downward diagonal wavefront, the receiving neuron core determines that the spike message is intended for the future time-step and stores the spike message for later processing.

23. The at least one machine readable medium of claim 15, wherein barrier messages are exchanged between a neuron core of the plurality of neuron cores and a subset of other neuron cores of the plurality of neuron cores, the subset of other neuron cores including neuron cores that the neuron core communicates with directly.

24. The at least one machine readable medium of claim 15, wherein barrier messages flush the mesh on a single chip including the plurality of neuron cores, and barrier messages sent on a second-level mesh between the single chip and other chips are only sent between the single chip and a subset of chips that communicate directly.

25. The at least one machine readable medium of claim 15, wherein the mesh is arranged in a two-dimensional or a three-dimensional grid.

* * * * *